US012250457B2

(12) United States Patent
Verma et al.

(10) Patent No.: US 12,250,457 B2
(45) Date of Patent: Mar. 11, 2025

(54) SYSTEMS AND METHODS OF IMAGING WITH MULTI-DOMAIN IMAGE SENSOR

(71) Applicant: QUALCOMM Incorporated, San Diego, CA (US)

(72) Inventors: Nikhil Verma, Bangalore (IN); Naga Chandan Babu Gudivada, Hyderabad (IN); Prakasha Nayak, Parkala (IN); Vishnu Vardhan Kasilya Sudarsan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/930,008

(22) Filed: Sep. 6, 2022

(65) Prior Publication Data

US 2024/0080552 A1    Mar. 7, 2024

(51) Int. Cl.
*H04N 23/67*    (2023.01)
*H04N 23/667*   (2023.01)

(52) U.S. Cl.
CPC ........... *H04N 23/67* (2023.01); *H04N 23/667* (2023.01)

(58) Field of Classification Search
None
See application file for complete search history.

(56) References Cited

U.S. PATENT DOCUMENTS

| 2011/0134293 A1* | 6/2011 | Tanaka | H04N 23/672 348/E5.045 |
| 2014/0104571 A1* | 4/2014 | Ogura | A61B 3/14 351/246 |
| 2019/0065845 A1* | 2/2019 | Xu | G06F 21/602 |

OTHER PUBLICATIONS

International Search Report and Written Opinion—PCT/US2023/070374—ISA/EPO—Sep. 22, 2023.

* cited by examiner

*Primary Examiner* — James M Anderson, II
(74) *Attorney, Agent, or Firm* — Polsinelli/Qualcomm

(57) ABSTRACT

Imaging systems and techniques are described. An imaging system can receive image data from an image sensor with different sets of photodetectors sensitive to different electromagnetic (EM) frequency domains. The imaging system determines, based on image data of a scene received from the image sensor, a first focus setting for focusing on the scene using the image sensor in the first domain. The imaging system determines, based on the first focus setting and a difference between respective characteristics of the first domain and a second domain, a second focus setting for focusing on the scene using the image sensor in the second domain. The imaging system causes the image sensor to capture a first image of the scene in the first domain according to the first focus setting, and to capture a second image of the scene in the second domain according to the second focus setting.

30 Claims, 10 Drawing Sheets

```
                                    ╱900
                                   ↙

┌─────────────────────────────────────────────────────────────────────┐
│ Determine, Based On Image Data Of A Scene Received From An Image Sensor, A First Focus │
│ Setting For Focusing On The Scene Using The Image Sensor In A First Electromagnetic (EM) │
│                            Frequency Domain                         │
│                                 905                                 │
└─────────────────────────────────────────────────────────────────────┘
                                    │
                                    ▼
┌─────────────────────────────────────────────────────────────────────┐
│ Determine, Based On The First Focus Setting And A Difference Between Respective │
│ Characteristics Of The First EM Frequency Domain And A Second EM Frequency Domain, A │
│ Second Focus Setting For Focusing On The Scene Using The Image Sensor In The Second EM │
│                            Frequency Domain                         │
│                                 910                                 │
└─────────────────────────────────────────────────────────────────────┘
                                    │
                                    ▼
┌─────────────────────────────────────────────────────────────────────┐
│ Cause The Image Sensor To Capture A First Image Of The Scene In The First EM Frequency │
│             Domain According To The First Focus Setting             │
│                                 915                                 │
└─────────────────────────────────────────────────────────────────────┘
                                    │
                                    ▼
┌─────────────────────────────────────────────────────────────────────┐
│ Cause The Image Sensor To Capture A Second Image Of The Scene In The Second EM │
│           Frequency Domain According To The Second Focus Setting    │
│                                 920                                 │
└─────────────────────────────────────────────────────────────────────┘
```

FIG. 9

SYSTEMS AND METHODS OF IMAGING WITH MULTI-DOMAIN IMAGE SENSOR

FIELD

This application is related to image capture and processing. More specifically, this application relates to systems and methods of using an image sensor that is configured to capture different electromagnetic frequency domains, such as visible light and infrared, including to reduce cross-domain contamination and to generate domain-specific focus settings.

BACKGROUND

Many devices include one or more cameras. For example, a smartphone or tablet includes a front facing camera to capture selfie images and a rear facing camera to capture an image of a scene (such as a landscape or other scenes of interest to a device user). A camera can capture images using an image sensor of the camera, which can include an array of photodetectors. Photodetectors can be sensitive to light from a given electromagnetic (EM) frequency domain, such as the visible light EM frequency domain, allowing the corresponding image sensor to capture images in the given EM frequency domain.

BRIEF SUMMARY

In some examples, systems and techniques are described for image processing. An imaging system can receive image data from an image sensor with different sets of photodetectors sensitive to different electromagnetic (EM) frequency domains. The imaging system determines, based on image data of a scene received from the image sensor, a first focus setting for focusing on the scene using the image sensor in a first EM frequency domain. The imaging system determines, based on the first focus setting and a difference between respective characteristics of the first EM frequency domain and a second EM frequency domain, a second focus setting for focusing on the scene using the image sensor in the second EM frequency domain. The imaging system causes the image sensor to capture a first image of the scene in the first EM frequency domain according to the first focus setting, and causes the image sensor to capture a second image of the scene in the second EM frequency domain according to the second focus setting.

According to at least one example, a method is provided for determining one or more image settings. The method includes: determining, based on image data of a scene received from an image sensor, a first focus setting for focusing on the scene using the image sensor in a first electromagnetic (EM) frequency domain; determining, based on the first focus setting and a difference between respective characteristics of the first EM frequency domain and a second EM frequency domain, a second focus setting for focusing on the scene using the image sensor in the second EM frequency domain; causing the image sensor to capture a first image of the scene in the first EM frequency domain according to the first focus setting; and causing the image sensor to capture a second image of the scene in the second EM frequency domain according to the second focus setting.

In another example, an apparatus for determining one or more image settings is provided that includes at least one memory and at least one processor coupled to the at least one memory. The at least one processor is configured to: determine, based on image data of a scene received from an image sensor, a first focus setting for focusing on the scene using the image sensor in a first electromagnetic (EM) frequency domain; determine, based on the first focus setting and a difference between respective characteristics of the first EM frequency domain and a second EM frequency domain, a second focus setting for focusing on the scene using the image sensor in the second EM frequency domain; cause the image sensor to capture a first image of the scene in the first EM frequency domain according to the first focus setting; and cause the image sensor to capture a second image of the scene in the second EM frequency domain according to the second focus setting.

In another example, a non-transitory computer-readable medium is provided that has stored thereon instructions that, when executed by one or more processors, cause the one or more processors to: determine, based on image data of a scene received from an image sensor, a first focus setting for focusing on the scene using the image sensor in a first electromagnetic (EM) frequency domain; determine, based on the first focus setting and a difference between respective characteristics of the first EM frequency domain and a second EM frequency domain, a second focus setting for focusing on the scene using the image sensor in the second EM frequency domain; cause the image sensor to capture a first image of the scene in the first EM frequency domain according to the first focus setting; and cause the image sensor to capture a second image of the scene in the second EM frequency domain according to the second focus setting.

In another example, an apparatus for determining one or more image settings is provided. The apparatus includes: means for determining, based on image data of a scene received from an image sensor, a first focus setting for focusing on the scene using the image sensor in a first electromagnetic (EM) frequency domain; means for determining, based on the first focus setting and a difference between respective characteristics of the first EM frequency domain and a second EM frequency domain, a second focus setting for focusing on the scene using the image sensor in the second EM frequency domain; means for causing the image sensor to capture a first image of the scene in the first EM frequency domain according to the first focus setting; and means for causing the image sensor to capture a second image of the scene in the second EM frequency domain according to the second focus setting.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 9 is a flow diagram illustrating an imaging process, in accordance with some examples.

DETAILED DESCRIPTION

Figure 1:
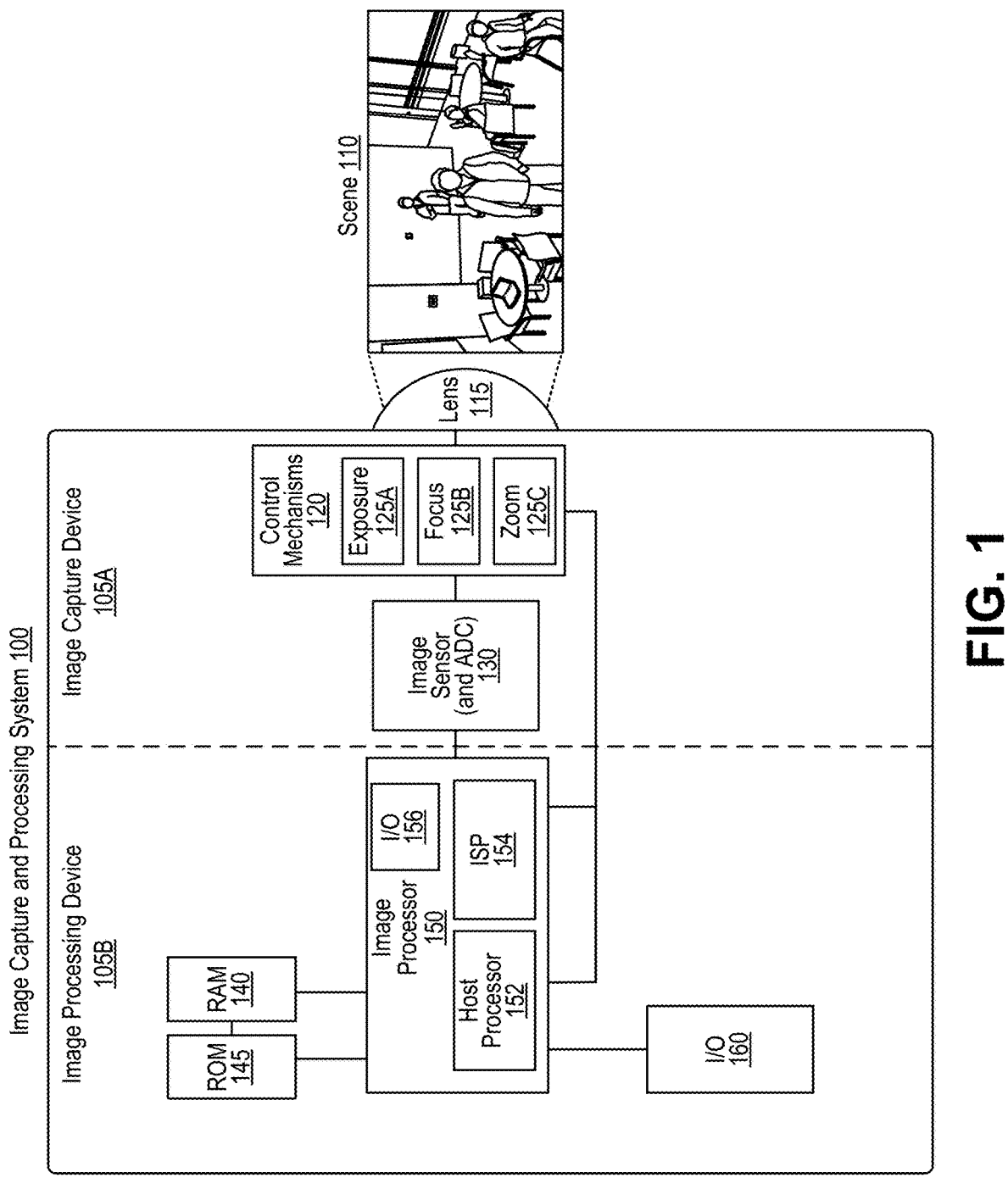
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A camera can capture images using an image sensor of the camera, which can include an array of photodetectors. Photodetectors can be sensitive to light from a given electromagnetic (EM) frequency domain, such as the visible light EM frequency domain, allowing the corresponding image sensor to capture images in the given EM frequency domain.

In some examples, systems and techniques are described for image processing. An imaging system can receive image data from an image sensor with different sets of photodetectors sensitive to different electromagnetic (EM) frequency domains. The imaging system determines, based on image data of a scene received from the image sensor, a first focus setting for focusing on the scene using the image sensor in a first EM frequency domain. The imaging system determines, based on the first focus setting and a difference between respective characteristics of the first EM frequency domain and a second EM frequency domain, a second focus setting for focusing on the scene using the image sensor in the second EM frequency domain. The imaging system causes the image sensor to capture a first image of the scene in the first EM frequency domain according to the first focus setting, and causes the image sensor to capture a second image of the scene in the second EM frequency domain according to the second focus setting.

The imaging systems and techniques described herein provide a number of technical improvements over prior imaging systems. For instance, the imaging systems and techniques described herein provide improved image quality for systems with multi-domain image sensors, since both cross-domain contamination reduction and per-domain focus settings improve image quality. For instance, the imaging system performing cross-domain contamination reduction reduces or removes visual artifacts from images captured in each EM frequency domain caused by image data from the other EM frequency domain(s) that the image sensor is sensitive to. The imaging system generating per-domain focus settings allows the imaging system to account for differences in characteristic(s) of the different EM frequency domains, and generate separate focus settings for each EM frequency domain, improving focus for respective images captured in each EM frequency domain.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1020, read-only memory (ROM) 145 and/or 1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1002.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
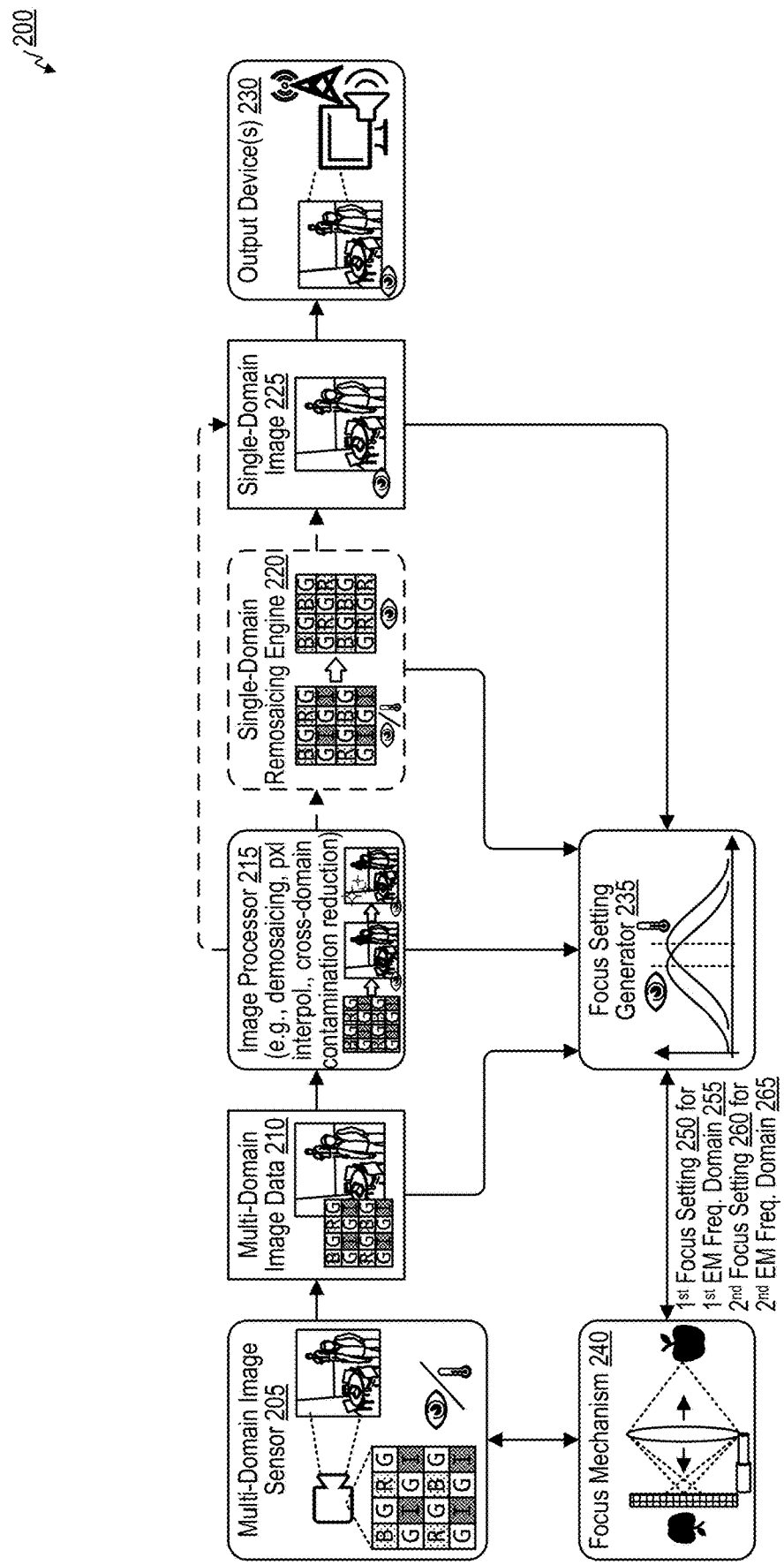
FIG. 2 is a block diagram illustrating an example architecture an imaging system that performs an imaging process using a multi-domain image sensor, in accordance with some examples.

FIG. 2 is a block diagram illustrating an example architecture an imaging system 200 that performs an imaging process using a multi-domain image sensor 205. The imaging system 200 can include at least one of the image capture and processing system 100, the image capture device 105A, the image processing device 105B, the HMD 310, the mobile handset 410, the multi-domain image sensor 500, the imaging system 600, an imaging system that performs the imaging process 700, an imaging system that performs the imaging process 800, an imaging system that performs the imaging process 900, the computing system 1000, or a combination thereof. In some examples, the imaging system 200 can include, for instance, one or more laptops, phones, tablet computers, mobile handsets, video game consoles, vehicle computers, desktop computers, wearable devices, televisions, media centers, extended reality (XR) systems, virtual reality (VR) systems, augmented reality (AR) systems, mixed reality (MR) systems, head-mounted display (HMD) devices, other types of computing devices discussed herein, or combinations thereof.

The imaging system 200 includes a multi-domain image sensor 205 that captures multi-domain image data 210. Examples of the multi-domain image sensor 205 include the image capture and processing system 100, the image capture device 105A, the image processing device 105B, the image sensor 130, image sensor(s) of any of cameras 330A-330D, image sensor(s) of any of cameras 430A-430D, the multi-domain image sensor 500, an image sensor that captures the dual-domain raw image data 605, an image sensor of the multi-domain camera 740 of the imaging process 700, an image sensor that captures the images of the imaging process 800, the image sensor of the imaging process 900, an image sensor of an input device 1045, or a combination thereof. In some examples, the multi-domain image data 210 includes raw image data, image data, pixel data, image frame(s), raw video data, video data, video frame(s), or a combination thereof.

A first portion of the multi-domain image sensor 205 is sensitive to a first electromagnetic (EM) frequency domain 255. A second portion of the multi-domain image sensor 205 is sensitive to a second EM frequency domain 265. In some examples, a third portion of the multi-domain image sensor 205 is sensitive to a third EM frequency domain, and so forth, with different portions of the image sensor sensitive to any number of different EM frequency domains. Different EM frequency domains can include, for example, the radio EM frequency domain, the microwave EM frequency domain, the infrared (IR) EM frequency domain, the visible light (VL) EM frequency domain, the ultraviolet (UV) EM frequency domain, the X-Ray EM frequency domain, the gamma ray EM frequency domain, a subset of any of these, or a combination thereof. A given portion of the multi-domain image sensor 205 can be sensitive to any of these listed EM frequency domains, subsets thereof, and/or combinations thereof. Subsets of EM frequency domains can include, for instance, different colors of visible light (e.g., red, blue, green), frequency bands within a given EM frequency domain, frequency bands spanning across at least portion(s) of two or more EM frequency domains, or combinations thereof. For instance, in some examples, the VL EM frequency domain can include red (R), green (G), blue (B), or a combination thereof. In some examples, the IR EM frequency domain can include near infrared (NIR), mid infrared (MIR), far infrared (FIR), or a combination thereof.

The multi-domain image sensor 205 includes at least one array of photodetectors. In some examples, a photodetector in the array can are covered by at least one filter that can control which EM frequency domain(s) (and/or subsets and/or combinations thereof) reach the photodetector, effectively controlling which EM frequency domain(s) (and/or subsets and/or combinations thereof) the photodetector is sensitive to. In some examples, different photodetectors in the array can be covered by different filters. In some examples, different photodetectors in the array can be sensitive to different EM frequency domain(s) (and/or subsets and/or combinations thereof), for instance based on use of filters, based on the characteristics of the photodetectors themselves, or a combination thereof. For instance, in some examples, the multi-domain image sensor 205 includes a first set of photodetectors that is sensitive to a first EM frequency domain 255 and a second set of photodetectors that is sensitive to a second EM frequency domain 265. In some examples, the multi-domain image sensor 205 additionally includes a third set of photodetectors that is sensitive to a third EM frequency domain, and so forth, with different sets of photodetectors of the image sensor sensitive to any number of different EM frequency domains.

In an illustrative example, the multi-domain image sensor 205 includes a first portion (e.g., a first set of photodetectors) that is sensitive to the visible light EM frequency domain, and a second portion (e.g., a second set of photodetectors) that is sensitive to the IR EM frequency domain. The first portion (e.g., a first set of photodetectors) can be further divided into sub-portions (e.g., subsets of the first set of photodetectors) that are sensitive to different colors (e.g., red, green, and/or blue) of the visible light EM frequency domain. A graphic representing the multi-domain image sensor 205 is illustrated in FIG. 2, and illustrates a camera capturing a photo of a scene with two people in a room near a laptop on a table. An exemplary portion of a photodetector array of the multi-domain image sensor 205 of the camera is illustrated as a grid, with each cell in the grid representing a photodetector that is sensitive to a particular EM frequency domain (or subset thereof) marked on the cell. Cells marked "R" are sensitive to red light from the visible light EM frequency domain. Cells marked "G" are sensitive to green light from the visible light EM frequency domain. Cells marked "B" are sensitive to blue light from the visible light EM frequency domain. Cells marked "I" are sensitive to infrared signals from the infrared EM frequency domain. The graphic also includes an icon of an eye to represent the visible light EM frequency domain, and an icon of a thermometer to represent the infrared light EM frequency domain. Within FIG. 2, a graphic representing the raw sensor data 210 illustrates a representation of an image of the scene that is depicted in the graphic representing the multi-domain image sensor 205, along with the grid representing the photodetector array of the multi-domain image sensor 205, to indicate that the multi-domain image data 210 can include raw image data that is not yet demosaiced. It should be understood that the illustrative example is exemplary rather than limiting. For instance, the multi-domain image sensor 205 can include a different arrangement of photodetectors. The multi-domain image sensor 205 can be sensitive to different sets of EM frequency domains.

In some examples, the multi-domain image sensor 205 can be directed toward a user (e.g., can face toward the user), and can thus capture sensor data (e.g., image data) of (e.g., depicting or otherwise representing) at least portion(s) of the user. In some examples, the multi-domain image sensor 205 can be directed away from the user (e.g., can face away from the user) and/or toward an environment that the user is in, and can thus capture sensor data (e.g., image data) of (e.g., depicting or otherwise representing) at least portion(s) of the environment. In some examples, multi-domain image data 210 captured by the multi-domain image sensor 205 is directed away from the user and/or toward the user. In some examples, multi-domain image data 210 captured by the multi-domain image sensor 205 is can have a field of view (FoV) that includes, is included by, overlaps with, and/or otherwise corresponds to, a FoV of the eyes of the user.

In some examples, imaging system 200 can also include one or more other sensors in addition to the multi-domain image sensor 205, such as one or more other cameras, other image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the one or more sensors 205 include at least one input device 1145 of the computing system 1100. In some implementations, one or more of these additional sensor(s) may complement or refine sensor readings from the multi-domain image sensor 205. For example, Inertial Measurement Units (IMUs), accelerometers, gyroscopes, or other sensors may be used to identify a pose (e.g., position and/or orientation) and/or motion(s) and/or acceleration(s) of the imaging system 200 and/or of the user in the environment, which can be used by the imaging system 200 to reduce motion blur, rotation blur, or combinations thereof.

The imaging system 200 passes the multi-domain image data 210 from the multi-domain image sensor 205 to an image processor 215. The image processor 215 can include the image processing device 105B, the image processor 150, the host processor 152, the ISP 154, the single-domain remosaicing engine 220, the focus setting generator 235, the computing system 1000, the processor 1010, or a combination thereof. The image processor 215 can demosaic and/or perform pixel interpolation on the multi-domain image data 210. The image processor 215 can perform other image processing operations, such as adjusting brightness, saturation, noise reduction, sharpness, contrast, luminosity, white balance, black balance, and/or other attributes of the multi-domain image data 210. In some examples, The image processor 215 can demosaic and/or perform pixel interpolation on the multi-domain image data 210 to generate an image based on only a subset of the multi-domain image data 210 corresponding to photodetectors sensitive to a specified EM frequency domain.

In an illustrative example, the image processor 215 can demosaic the multi-domain image data 210 using only the image data from the photodetectors sensitive to the visible light EM frequency domain, ignoring or skipping image data from the photodetectors sensitive to the IR EM frequency domain. The image processor 215 can use pixel interpolation to fill in the gaps in the image caused by ignoring or skipping image data from the photodetectors sensitive to the IR EM frequency domain. In another illustrative example, the image processor 215 can demosaic the multi-domain image data 210 using only the image data from the photodetectors sensitive to the IR EM frequency domain, ignoring or skipping image data from the photodetectors sensitive to the visible EM frequency domain. In some examples, the image processor 215 can use pixel interpolation to fill in the gaps in the image caused by ignoring or skipping image data from the photodetectors sensitive to the visible light EM frequency domain.

In some situations, when multi-domain image data 210 is processed using the image processor 215 to only use image data from a first EM frequency domain 255 that the multi-domain image sensor 205 is sensitive to as discussed above, the resulting image generated by the image processor 215 can include image artifacts. These image artifacts can be caused by contamination from a second EM frequency domain 265 that the multi-domain image sensor 205 is also sensitive to. These visual artifacts can include false colors and/or chromatic aberration(s), and can appear particularly at or around sharp edges in the image. This contamination, and/or these image artifacts, can be referred to as cross-domain contamination. The image processor 215 can perform cross-domain contamination reduction on the multi-domain image data 210 to reduce cross-domain contamination. Cross-domain contamination reduction can reduce contamination from of image data from one EM frequency domain captured by the multi-domain image sensor 205 on image data from another EM frequency domain captured by the multi-domain image sensor 205. In some examples, cross-domain contamination reduction can entail multiplying a pixel data value of the contaminating EM frequency domain in a location or area of the image by a constant, and subtracting the product from a pixel data value of a target EM frequency domain in the location or area of the image.

In an illustrative example, the image processor 215 can generate a visible-light image from the multi-domain image data 210 by skipping infrared photodetector data from the multi-domain image data 210 while demosacing as discussed above. The image processor 215 can use pixel interpolation to fill in gaps as discussed above. The visible-light image that the image processor 215 generates from the multi-domain image data 210 may still have cross-domain contamination from the IR image data. To reduce the cross-domain contamination, the image processor 215 perform cross-domain contamination reduction on the visible light image, using the multi-domain image data 210.

Each IR-sensitive photodetector in the multi-domain image sensor 205 can be adjacent to at least one VL-sensitive photodetector. The pixel data value from a given IR-sensitive photodetector can be multiplied by a constant, and the product can be subtracted from the pixel data value from a VL-sensitive photodetector that is adjacent to the IR-sensitive photodetector. Different constants can be used for different colors or subsets of an EM frequency domain. For instance, the pixel data value from a given IR-sensitive photodetector can be multiplied by a first constant a, and the product can be subtracted from the pixel data value from a red-sensitive photodetector that is adjacent to the IR-sensitive photodetector. The pixel data value from a given IR-sensitive photodetector can be multiplied by a second constant b, and the product can be subtracted from the pixel data value from a green-sensitive photodetector that is adjacent to the IR-sensitive photodetector. the pixel data value from a given IR-sensitive photodetector can be multiplied by a third constant c, and the product can be subtracted from the pixel data value from a blue-sensitive photodetector that is adjacent to the IR-sensitive photodetector.

In some examples, an average of pixel data from multiple IR-sensitive photodetectors in an area with a VL-sensitive photodetector, multiplied by the appropriate constant, can be subtracted from the pixel data from the VL-sensitive photodetector. The average can be a weighted average based on a distance from the VL-sensitive photodetector to the corresponding IR-sensitive photodetector. For instance, in an illustrative example, an average of pixel data the four closest IR-sensitive photodetectors to a given VL-sensitive photodetector can be multiplied by the appropriate constant and subtracted from the pixel data from the VL-sensitive photodetector.

In some examples, an average of pixel data from one or more IR-sensitive photodetectors from multiple image frames in an area with a VL-sensitive photodetector at a given frame, multiplied by the appropriate constant, can be subtracted from the pixel data from the VL-sensitive photodetector. The average can be a weighted average based on how far away in time the frames with the IR-sensitive photodetectors are from the frames with the VL-sensitive photodetector, and/or the distance as discussed above. For instance, in an illustrative example, an average of pixel data from the closest IR-sensitive photodetector to a given VL-sensitive photodetector from a given frame and the previous frame can be multiplied by the appropriate constant and subtracted from the pixel data from the VL-sensitive photodetector from the given frame.

Figure 6:
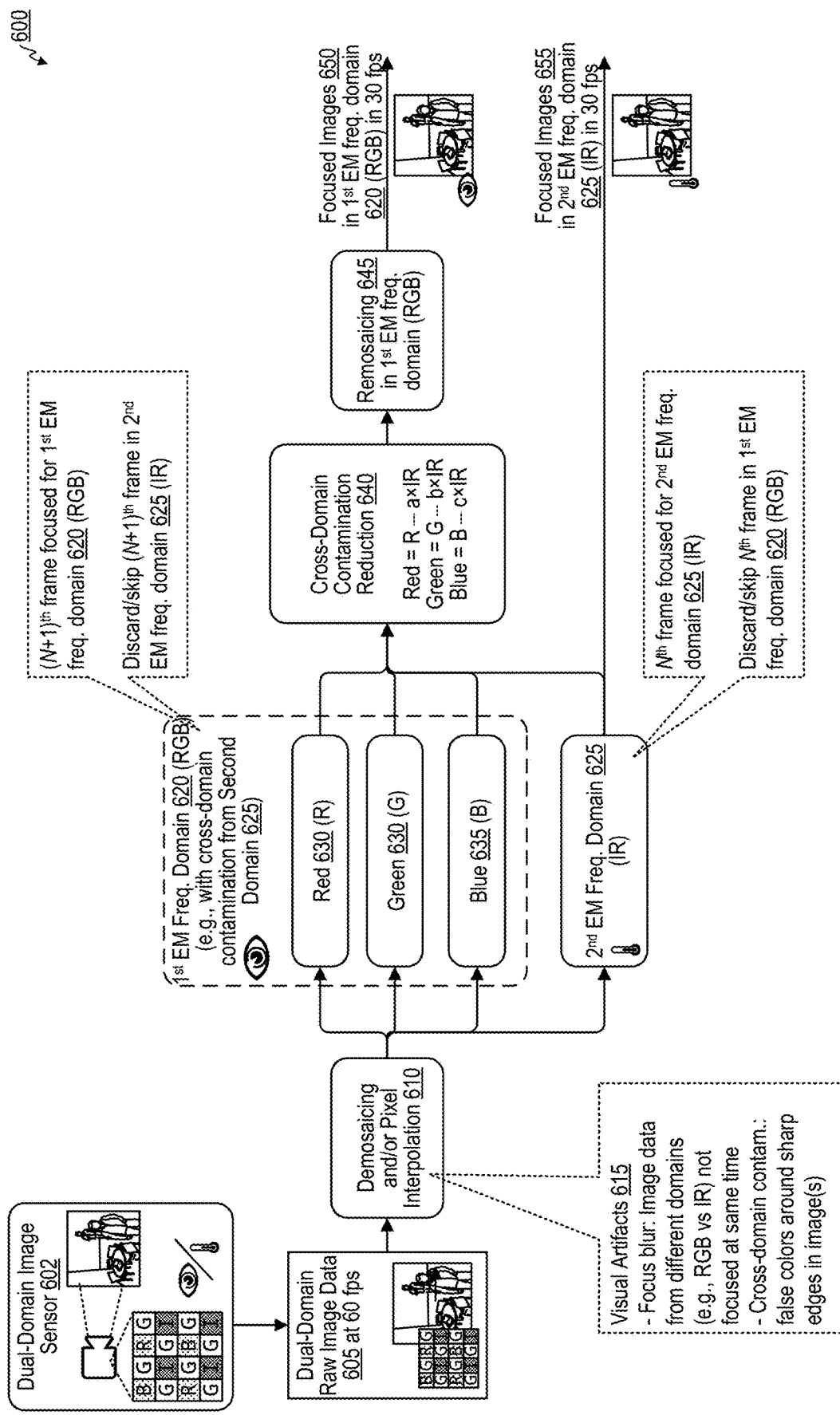
FIG. 6 is a block diagram illustrating an example architecture an imaging system that performs an imaging process using a multi-domain image sensor that is sensitive to a first electromagnetic (EM) frequency domain and a second EM frequency domain, in accordance with some examples.

Further examples of cross-domain contamination reduction are illustrated and discussed further in FIG. 6. The image processor 215 can output a single-domain image 225, which may be processed using demosaicing, pixel interpolation, and/or cross-domain contamination reduction as discussed above.

A graphic representing the image processor 215 is illustrated in FIG. 2, and illustrates the image processor 215 converting the multi-domain image data 210 (represented by a photodetector array) into a single-domain image through demosaicing and/or pixel interpolation as discussed above. The single-domain image is illustrated as an image of the scene depicted as being photographed by the multi-domain image sensor 205, in a single EM frequency domain as represented by an eye icon. The graphic also illustrates the image processor 215 performing cross-domain contamination reduction on the single-domain image, to generate a processed image, which is illustrated appearing similar to the single-domain image but with a sparkle graphic representing the cross-domain contamination reduction. The processed image may be the single-domain image 225.

A graphic representing the single-domain image 225 is illustrated in FIG. 2, and illustrates an image of the scene depicted as being photographed by the multi-domain image sensor 205, in a single EM frequency domain as represented by an eye icon. The eye icon represents the visible light EM frequency domain. The single domain can be the visible light EM frequency domain, and the contaminating EM frequency domain can be the IR EM frequency domain, as discussed in some of the illustrative examples discussed above. The single domain can be the IR EM frequency domain, and the contaminating EM frequency domain can be the visible EM frequency domain, as discussed in some of the other illustrative examples discussed above.

In some examples, the imaging system 200 includes a single-domain remosaicing engine 220. The single-domain remosaicing engine 220 can include the image processing device 105B, the image processor 150, the host processor 152, the ISP 154, the image processor 215, the focus setting generator 235, the computing system 1000, the processor 1010, or a combination thereof. The single-domain remosaicing engine 220 can remosaic the image (e.g., the single-domain image 225) generated using the image processor 215 (e.g., as processed using demosaicing, pixel interpolation, and/or cross-domain contamination reduction) according to a photodetector array arrangement associated with a single EM frequency domain. The output of the single-domain remosaicing engine 220 can simulate raw image data captured by a single-domain image sensor. The photodetector array arrangement associated with a single EM frequency domain can be a photodetector array arrangement that can be used in a single-domain image sensor sensitive to the single EM frequency domain. For instance if the single EM frequency domain is the visible light EM frequency domain, then the single-domain remosaicing engine 220 can remosaic the image generated using the image processor 215 according to an arrangement of photodetectors sensitive to red, green, and blue, respectively (e.g., a Bayer filter arrangement). In some examples, the output of the single-domain remosaicing engine 220 is the single-domain image 225.

A graphic representing the single-domain remosaicing engine 220 is illustrated in FIG. 2, and illustrates a conversion from a multi-domain photodetector array arrangement (e.g., with VL-sensitive photodetectors and IR-sensitive photodetectors) to a single-domain photodetector array arrangement (e.g., with only VL-sensitive photodetectors, without IR-sensitive photodetectors).

The imaging system 200 also includes a focus setting generator 235. The focus setting generator 235 can include the image processing device 105B, the image processor 150, the host processor 152, the ISP 154, the image processor 215, the single-domain remosaicing engine 220, the computing system 1000, the processor 1010, or a combination thereof. The focus setting generator 235 can determine focus settings for different EM frequency domains.

The focus setting generator 235 solves a problem with the multi-domain image sensor 205, in that it is not always possible for the multi-domain image sensor 205 to be optimally focused on a subject in two different EM frequency domains, since different EM radiation with different EM frequency domains refracts slightly differently. This refraction difference is sufficient to produce noticeable differences in focus between different EM frequency domains, such as visible light and infrared. For instance, for subjects closer than a hyperfocal distance, adjusting the lens to bring the visible light EM frequency domain channels into focus can cause the infrared EM frequency domain channels to be defocused and blurry, and vice versa. Demultiplexing of the image data from the different EM frequency domains can cause defocus blur to transfer from one EM frequency domain to another EM frequency domain.

The focus setting generator 235 can use autofocus process(es) to determine a focus setting for a first EM frequency domain 255 of the multiple EM frequency domains that the multi-domain image sensor 205 is sensitive to. The autofocus process(es) used by the focus setting generator 235 can include contrast detection autofocus (CDAF), phase detection autofocus (PDAF), hybrid autofocus (HAF) systems that use a combination of PDAF and CDAF, or a combination thereof. The focus setting generator 235 can perform autofocus based on input data, which may include the multi-domain image data 210 captured by the multi-domain image sensor 205, the single-domain image (e.g., single-domain image 225) generated using the image processor 215, the single-domain image (e.g., single-domain image 225) generated using the single-domain remosaicing engine 220, information about focus settings used during capture of the multi-domain image data 210 from a focus mechanism 240, or a combination thereof. To generate a focus setting specific to the first EM frequency domain 255, the focus setting generator 235 can use image data specific to the first EM frequency domain 255 from the multi-domain image data 210, and can exclude image data specific to other EM frequency domain(s) from the multi-domain image data 210, while performing autofocus analyses of image data as discussed below.

To perform CDAF, the focus setting generator 235 actuates a focus mechanism 240 to cause a lens (e.g., lens 115) of imaging system 200 to move through a range of lens positions. The focus mechanism 240 can include a linear actuator, such as a voice coil motor (VCM). The focus mechanism 240 can be an example of the one or more focus control mechanisms 125B. In some examples, the focus setting generator 235 may use pre-specified distance intervals between each tested lens position. In between and/or during these lens movements, the focus setting generator 235 causes the multi-domain image sensor 205 to capture image frames that the focus setting generator 235 analyzes to determine a contrast between pixels in the first EM frequency domain 255 of the image frames (e.g., a contrast between pixels representing a subject and pixels representing a background). Eventually, the focus setting generator 235 identifies one of these image frames at which the contrast between the subject's pixels and background pixels is maximized. The lens position at which this contrast is maximized in the first EM frequency domain 255 is determined to be the lens position at which the multi-domain image sensor 205 is best focused on the subject in the first EM frequency domain 255.

To perform PDAF, the focus setting generator 235 obtains phase detection (PD) data from specialized phase detection (PD) photodetectors from among the photodetectors that are sensitive to the first EM frequency domain 255. The PD photodetectors are configured (e.g., via opaque pixel aperture masks and/or portions of larger lenses that cover multiple photodetectors) to receive light only from certain angles. The data from the PD photodetectors is analyzed by the focus setting generator 235 to identify whether light of the first EM frequency domain 255 that is received by the multi-domain image sensor 205 from different angles converges to create a focused image that is "in phase" or fails to converge and thus creates a blurry images that is "out of phase." If light received from different angles is out of phase, the focus setting generator 235 identifies a direction in which the light is out of phase to determine whether the lens needs to be moved forward or backward, and identifies a phase disparity indicating how out of phase the light is to determine how far the lens (e.g., lens 115) is to be moved. The focus setting generator 235 then sends an actuation signal to the focus mechanism 240 over a connector to move the lens (e.g., lens 115) to the lens position corresponding to optimal focus. In some cases, a hybrid autofocus (HAF) system is used that uses both PDAF and CDAF. For instance, the lens movement directed by PDAF can still sometimes produce imperfect focus, and CDAF can be used within a short range of lens positions following PDAF in order to further optimize focus and compensate for any errors or inaccuracies in the PDAF.

The focus setting generator 235 can generate a first focus setting 250 for a first EM frequency domain 255 using PDAF, CDAF, HAF, or a combination thereof, as discussed above. In some examples, the focus setting generator 235 can generate a second focus setting 260 for a second EM frequency domain 265 based on the first focus setting 250 for the first EM frequency domain 255, and based on difference(s) in respective characteristic(s) of the first EM frequency domain 255 and the second EM frequency domain 265. The characteristic(s) can include the respective frequencies, wavelengths, and/or focal lengths associated with the first EM frequency domain 255 and the second EM frequency domain 265.

Focal length changes based on EM frequency domain. For instance, the refractive index of a medium ($\mu$) depends on the velocity of light in a vacuum (c) and the velocity of light in the medium (v) according to the equation $$\mu = \frac{c}{v}.$$

The velocity of light in the medium (v) likewise depends of frequency of the light (F) and wavelength of the light ($\lambda$) according to the equation $v = F \cdot \lambda$. The focal length (f) depends on the refractive index of a lens ($\mu_2$), the refractive index of a surrounding medium ($\mu_1$), the radius of curvature of the lens ($R_2$), and the radius of curvature of the surrounding medium ($R_1$), according to the equation $$\frac{1}{f} = \left(\frac{\mu_2}{\mu_1} - 1\right)\left(\frac{1}{R_1} - \frac{1}{R_2}\right).$$

Thus, the focal length (f) depends on frequency of the light (F) and wavelength of the light ($\lambda$) (e.g., on the EM frequency domain).

Therefore, as noted above, the focus setting generator 235 can generate a second focus setting 260 for a second EM frequency domain 265 based on the first focus setting 250 for the first EM frequency domain 255, and based on difference(s) in respective characteristic(s) of the first EM frequency domain 255 and the second EM frequency domain 265. The focal length (f) depends on the distance from the lens to the subject (u) and the distance from the lens to the image sensor (w) according to the equation $$\frac{1}{f} = \frac{1}{u} + \frac{1}{w}.$$

The distance from the lens to the subject (u) is the same regardless of EM frequency domain. Thus, the distance from the lens to the subject (u) is the same for both the first EM frequency domain 255 and the second EM frequency domain 265. The first focus setting 250 for the first EM frequency domain 255 indicates a distance from the lens to the image sensor for the first EM frequency domain 255 ($w_{d1}$). The focal length for the first EM frequency domain 255 ($f_{d1}$) and the focal length for the second EM frequency domain 265 ($f_{d2}$) can be calculated by the focus setting generator 235, for instance based on some of equations in the previous paragraph and/or based on measurements. The focus setting generator 235 can therefore generate the second focus setting 260 for the second EM frequency domain 265 by determining the distance from the lens to the image sensor for the second EM frequency domain 265 ($w_{d2}$) according to the equation $$\frac{1}{w_{d2}} = \frac{1}{f_{d2}} - \frac{1}{f_{d1}} + \frac{1}{w_{d1}}.$$

This equation can be derived as indicated below:

$$\frac{1}{f_{d1}} = \frac{1}{u} + \frac{1}{w_{d1}}$$

$$\frac{1}{f_{d2}} = \frac{1}{u} + \frac{1}{w_{d2}}$$

$$\frac{1}{f_{d2}} - \frac{1}{f_{d1}} = \frac{1}{w_{d2}} - \frac{1}{w_{d1}}$$

$$\frac{1}{w_{d2}} = \frac{1}{f_{d2}} - \frac{1}{f_{d1}} + \frac{1}{w_{d1}}$$

In some examples, the focus setting generator 235 can generate a second focus setting 260 for the second EM frequency domain 265 using PDAF, CDAF, HAF, or a combination thereof, as discussed above with respect to the focus setting generator 235 generating the first focus setting 250 for the first EM frequency domain 255.

The focus setting generator 235 can send the first focus setting 250 for the first EM frequency domain 255 and/or the second focus setting 260 for the second EM frequency domain 265 to the focus mechanism 240. For instance, the focus setting generator 235 can send the first focus setting 250 for the first EM frequency domain 255 to the focus mechanism 240 to actuate a linear actuator of the focus mechanism 240 to move the lens (e.g., lens 115) to a lens position ($P_{d1}$) identified by the first focus setting 250 (e.g., based on the distance $w_{d1}$). The focus setting generator 235 can send the second focus setting 260 for the second EM frequency domain 265 to the focus mechanism 240 to actuate the linear actuator of the focus mechanism 240 to move the lens (e.g., lens 115) to a lens position ($P_{d2}$) identified by the second focus setting 260 (e.g., based on the distance $w_{d2}$).

A graphic representing the focus setting generator 235 is illustrated in FIG. 2, and illustrates two focus value curves for first EM frequency domain 255 and the second EM frequency domain 265, respectively. The peaks in the respective focus value curves represent the first focus setting 250 for the first EM frequency domain 255 and the second focus setting 260 for the second EM frequency domain 265, respectively. The peaks in the respective focus value curves can represent peaks in contrast for CDAF, PD pixel data that is in phase, or a combination thereof. One of the focus value curves is labeled with an eye icon, indicating that one of the EM frequency domains can be the visible light EM frequency domain. The other one of the focus value curves is labeled with a thermometer icon, indicating that one of the EM frequency domains can be the IR EM frequency domain.

A graphic representing the focus mechanism 240 is illustrated in FIG. 2, and illustrates a lens (e.g., lens 115), a linear actuator for moving the lens, an image sensor (e.g., multi-domain image sensor 205), and a subject (e.g., an apple). Arrows are illustrated, indicating directions that the linear actuator can move the lens based on various focus settings received by the focus mechanism 240, such as the first focus setting 250 or the second focus setting 260.

In some examples, the imaging system 200 can configure the focus mechanism 240 to rapidly shift back and forth between the first focus setting 250 for the first EM frequency domain 255 and the second focus setting 260 for the second EM frequency domain 265. While the focus mechanism 240 is set to the first focus setting 250 for the first EM frequency domain 255, the imaging system 200 can generate the single-domain image 225 in the first EM frequency domain 255. While the focus mechanism 240 is set to the second focus setting 260 for the second EM frequency domain 265, the imaging system 200 can generate the single-domain image 225 in the second EM frequency domain 265. Because the differences in lens position between the first focus setting 250 and the second focus setting 260 can be small, the imaging system 200 can, in some examples, shift back and forth between the first focus setting 250 and the second focus setting 260 for every frame that the multi-domain image sensor 205 captures. This way, the imaging system 200 can capture a single-domain image 225 in the first EM frequency domain 255 with the first focus setting 250 for the first EM frequency domain 255, and can capture a single-domain image 225 in the second EM frequency domain 265 with the second focus setting 260 for the second EM frequency domain 265, and so forth. If the multi-domain image sensor 205 can capture the multi-domain image data 210 at 60 frames per second (fps), then the imaging system 200 can capture the single-domain image 225 in the first EM frequency domain 255 with the first focus setting 250 for the first EM frequency domain 255 at 30 fps, and the imaging system 200 can capture the single-domain image 225 in the second EM frequency domain 265 with the second focus setting 260 for the second EM frequency domain 265 at 30 fps.

The imaging system 200 includes output device(s) 230. The output device(s) 230 can include one or more visual output devices, such as display(s) or connector(s) therefor. The output device(s) 230 can include one or more audio output devices, such as speaker(s), headphone(s), and/or connector(s) therefor. The output device(s) 230 can include one or more of the output device 1035 and/or of the communication interface 1040 of the computing system 1000. In some examples, the imaging system 200 causes the display(s) of the output device(s) 230 to display the single-domain image 225. In some examples, the imaging system 200 causes the display(s) of the output device(s) 230 to display the single-domain image 225 in the first EM frequency domain 255 with the first focus setting 250 for the first EM frequency domain 255 at a first time, and the single-domain image 225 in the second EM frequency domain 265 with the second focus setting 260 for the second EM frequency domain 265 at a second time distinct from the first time.

In some examples, the output device(s) 230 include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1035 and/or of the communication interface 1040 of the computing system 1000. In some examples, the imaging system 200 causes the transceiver(s) to send, to a recipient device, the single-domain image 225. In some examples, the recipient device can include another imaging system 200, an HMD 310, a mobile handset 410, a computing system 1000, or a combination thereof. In some examples, the recipient device can include a display, and the data sent to the recipient device from the transceiver(s) of the output device(s) 230 can cause the display of the recipient device to display the single-domain image 225.

In some examples, the display(s) of the output device(s) 230 of the imaging system 200 function as optical "see-through" display(s) that allow light from the real-world environment (scene) around the imaging system 200 to traverse (e.g., pass) through the display(s) of the output device(s) 230 to reach one or both eyes of the user. For example, the display(s) of the output device(s) 230 can be at least partially transparent, translucent, light-permissive, light-transmissive, or a combination thereof. In an illustrative example, the display(s) of the output device(s) 230 includes a transparent, translucent, and/or light-transmissive lens and a projector. The display(s) of the output device(s) 230 of can include a projector that projects virtual content (e.g., the single-domain image 225) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the single-domain image 225) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 230 of the imaging system 200 are digital "pass-through" display that allow the user of the imaging system 200 and/or a recipient device to see a view of an environment by displaying the view of the environment on the display(s) of the output device(s) 230. The view of the environment that is displayed on the digital pass-through display can be a view of the real-world environment around the imaging system 200, for example based on sensor data (e.g., images, videos, depth images, point clouds, other depth data, or combinations thereof) captured by the multi-domain image sensor 205 (e.g., multi-domain image data 210 and/or single-domain image 225) and/or other sensors described herein. The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., the single-domain image 225) overlaid over other otherwise incorporated into the view of the environment.

Within FIG. 2, a graphic representing the output device(s) 230 illustrates a display, a speaker, and a wireless transceiver, outputting the first image illustrated in the graphics representing the multi-domain image sensor 205, the multi-domain image data 210, the image processor 215, and the single-domain image 225, with an eye icon representing that the output device(s) 230 are configured to output the single-domain image 225 associated with an EM frequency domain (e.g., the first EM frequency domain 255 and/or the second EM frequency domain 265).

It should be understood that references herein to the multi-domain image sensor 205, and other sensors described herein, as images sensors should be understood to also include other types of sensors that can produce outputs in image form, such as depth sensors that produce depth images and/or point clouds that can be expressed in image form and/or rendered images of 3D models (e.g., RADAR, LIDAR, SONAR, SODAR, ToF, structured light). It should be understood that references herein to image data, and/or to images, produced by such sensors can include any sensor data that can be output in image form, such as depth images, point clouds that can be expressed in image form, and/or rendered images of 3D models.

In some examples, certain elements of the imaging system 200 (e.g., the multi-domain image sensor 205, the image processor 215, the single-domain remosaicing engine 220, the output device(s) 230, the focus setting generator 235, or a combination thereof) include a software element, such as a set of instructions corresponding to a program, that is run on a processor such as the processor 1010 of the computing system 1000, the image processor 150, the host processor 152, the ISP 154, or a combination thereof. In some examples, one or more of these elements of the imaging system 200 can include one or more hardware elements, such as a specialized processor (e.g., the processor 1010 of the computing system 1000, the image processor 150, the host processor 152, the ISP 154, or a combination thereof). In some examples, one or more of these elements of the imaging system 200 can include a combination of one or more software elements and one or more hardware elements.

Figure 3A:
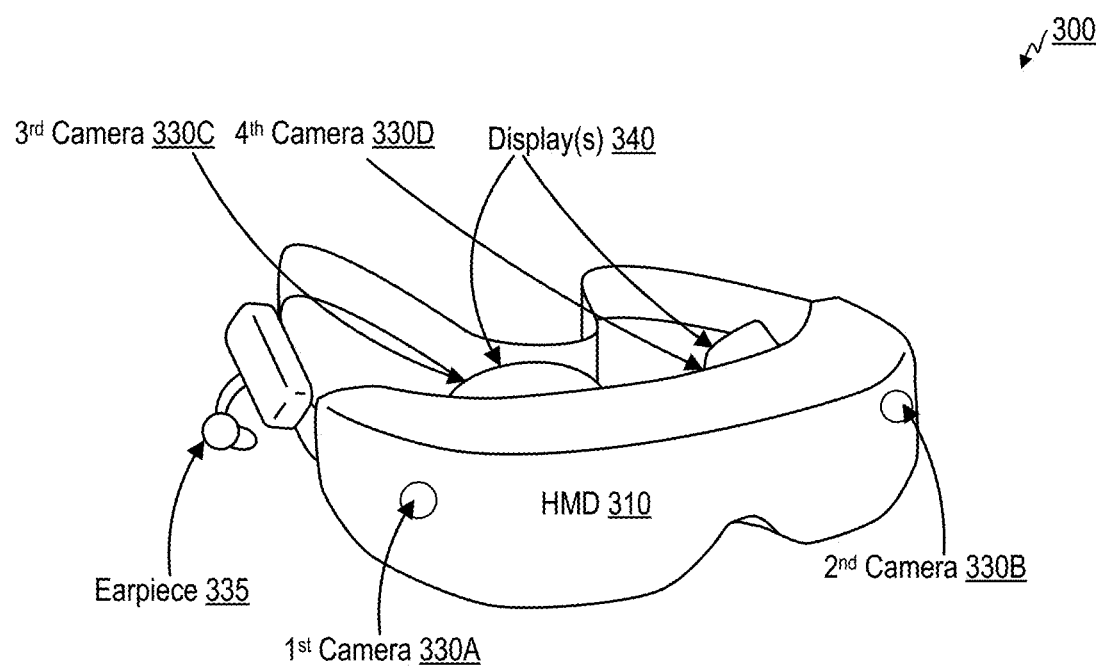
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of an imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of an imaging system 200. The HMD 310 includes a first camera 330A and a second camera 330B along a front portion of the HMD 310. The first camera 330A and the second camera 330B may be examples of the multi-domain image sensor 205 of the imaging system 200. The HMD 310 includes a third camera 330C and a fourth camera 330D facing the eye(s) of the user as the eye(s) of the user face the display(s) 340. The third camera 330C and the fourth camera 330D may be examples of the multi-domain image sensor 205 of the imaging system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of multi-domain image sensor 205 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 230 of the imaging system 200. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
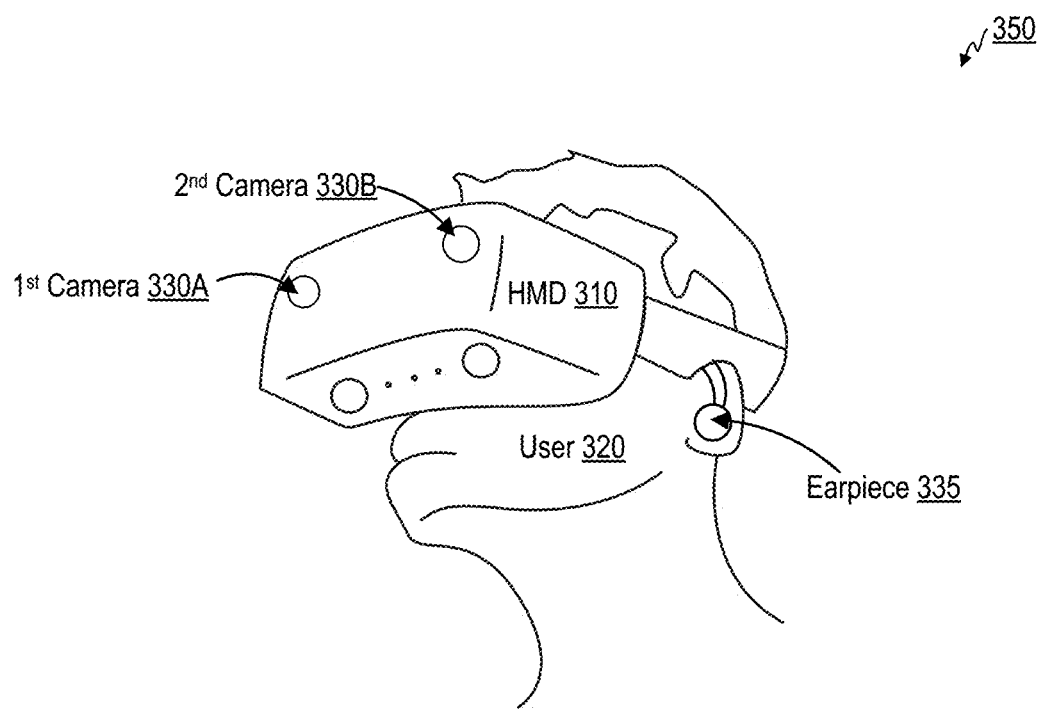
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s) 230. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the single-domain image 225. The output images can be based on the images captured by the first camera 330A and the second camera 330B (e.g., the multi-domain image data 210 and/or the single-domain image 225), for example with the virtual content (e.g., single-domain image 225) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
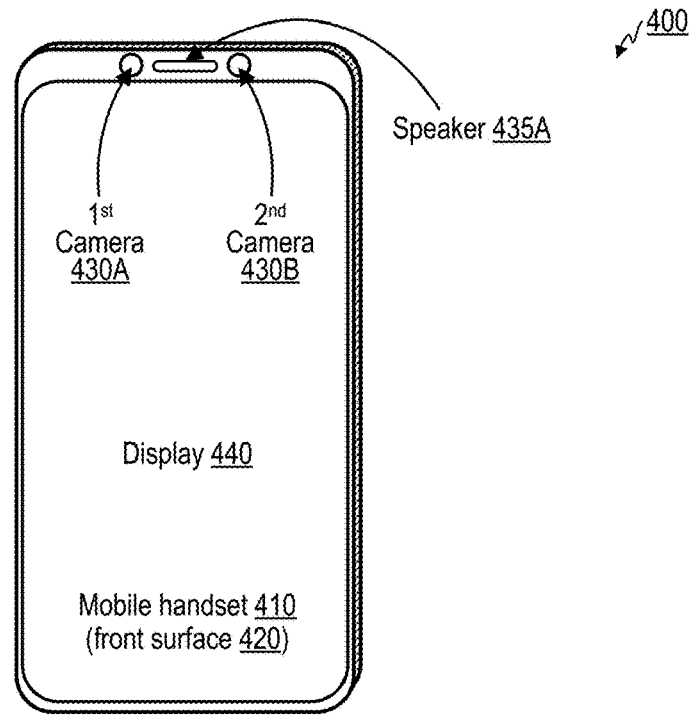
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200. The mobile handset 410 may be an example of an imaging system 200. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the multi-domain image sensor 205 of the imaging system 200. The first camera 430A and the second camera 430B can face the user, including the eye(s) of the user, while content (e.g., the multi-domain image data 210 and/or the single-domain image 225) is displayed on the display 440. The display 440 may be an example of the display(s) of the output device(s) 230 of the imaging system 200.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the single-domain image 225. The output images can be based on the images (e.g., the multi-domain image data 210 and/or the single-domain image 225) captured by the first camera 430A, the second camera 430B, the third camera 430C, and/or the fourth camera 430D, for example with the virtual content (e.g., single-domain image 225) overlaid.

In some examples, the front surface 420 of the mobile handset 410 may include one or more additional cameras in addition to the first camera 430A and the second camera 430B. The one or more additional cameras may also be examples of the multi-domain image sensor 205 of the imaging system 200. In some examples, the front surface 420 of the mobile handset 410 may include one or more additional sensors in addition to the first camera 430A and the second camera 430B. The one or more additional sensors may also be examples of the multi-domain image sensor 205 of the imaging system 200. In some cases, the front surface 420 of the mobile handset 410 includes more than one display 440. The one or more displays 440 of the front surface 420 of the mobile handset 410 can be examples of the display(s) of the output device(s) 230 of the imaging system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the front surface 420 of the mobile handset 410, with these microphones being examples of the multi-domain image sensor 205 of the imaging system 200. In some examples, the audio output by the mobile handset 410 to the user through the one or more speakers 435A and/or other audio output devices may include, or be based on, audio recorded using the one or more microphones.

Figure 4B:
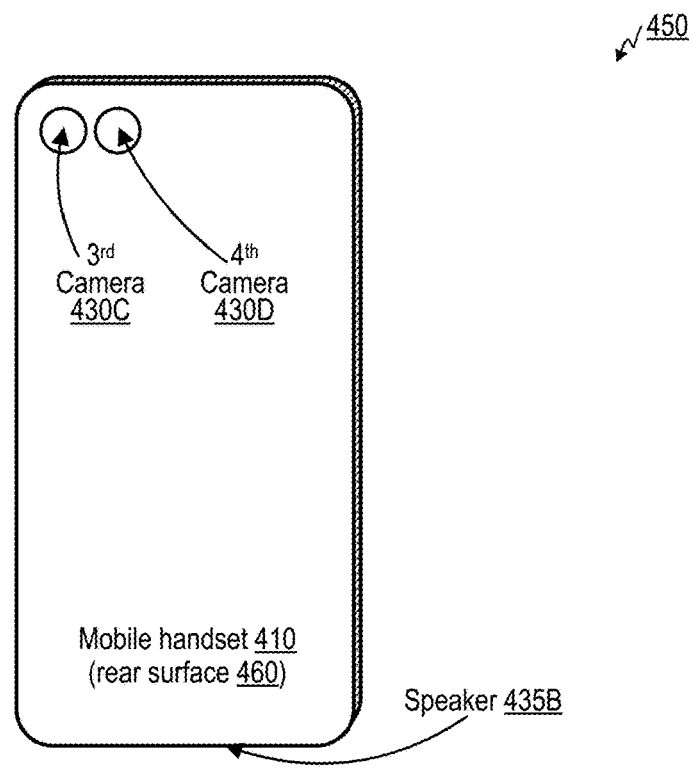
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of an imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the multi-domain image sensor 205 of the imaging system 200. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the multi-domain image sensor 205 of the imaging system 200. In some examples, the rear surface 460 of the mobile handset 410 may include one or more additional sensors in addition to the third camera 430C and the fourth camera 430D. The one or more additional sensors may also be examples of the multi-domain image sensor 205 of the imaging system 200. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the mobile handset 410 can include one or more microphones along and/or adjacent to the rear surface 460 of the mobile handset 410, with these microphones being examples of the multi-domain image sensor 205 of the imaging system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the single-domain image 225. The output images can be based on the images (e.g. the multi-domain image data 210 and/or the single-domain image 225) captured by the third camera 430C and/or the fourth camera 430D, for example with the virtual content (e.g., single-domain image 225) overlaid. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5:
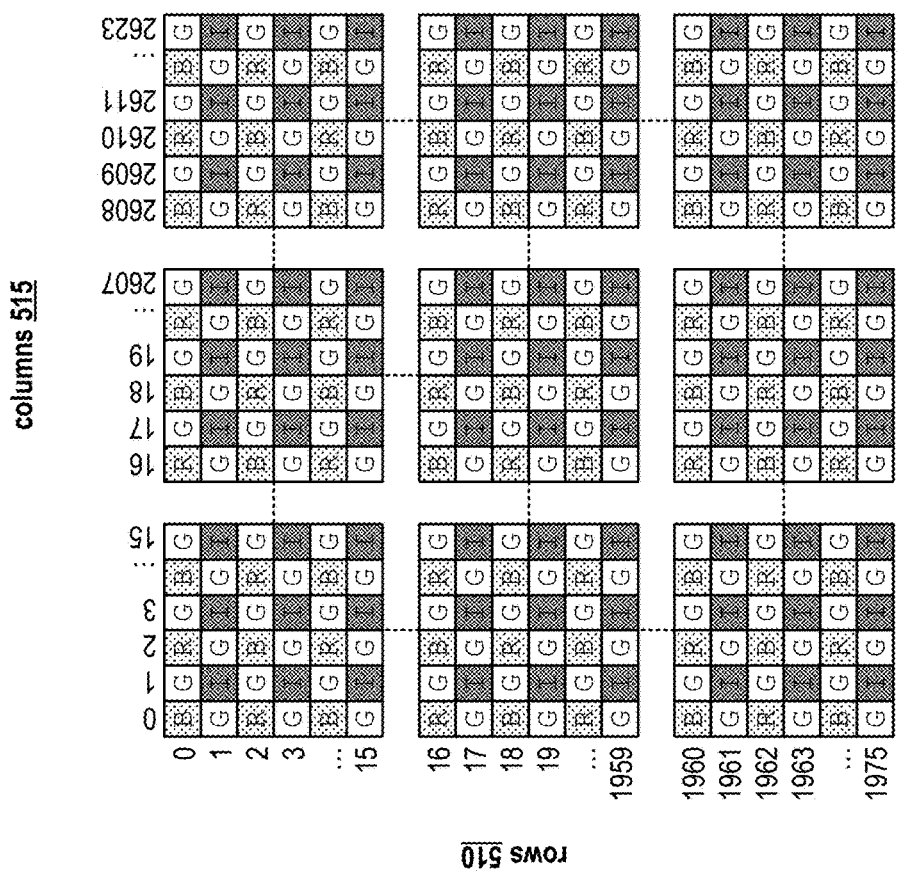
FIG. 5 is a conceptual diagram illustrating a photodetector array of a multi-domain image sensor, in accordance with some examples.

FIG. 5 is a conceptual diagram illustrating a photodetector array of a multi-domain image sensor 500. The multi-domain image sensor 500 is an example of the multi-domain image sensor 205 of the imaging system 200. The photodetector array of the multi-domain image sensor 500 is illustrated as a grid divided into 1976 rows 510 and 2624 columns 515. Each cell in the grid represents a photodetector that is sensitive to a particular EM frequency domain (or subset thereof) marked on the cell. Cells marked "R" are sensitive to red light from the visible light EM frequency domain. Cells marked "G" are sensitive to green light from the visible light EM frequency domain. Cells marked "B" are sensitive to blue light from the visible light EM frequency domain. Cells marked "I" are sensitive to infrared signals from the infrared EM frequency domain. The photodetectors that are sensitive to red, green, and blue are sensitive to the visible light EM frequency domain, which may be a first EM frequency domain of the multiple EM frequency domains that the multi-domain image sensor 500 is sensitive to. The photodetectors that are sensitive to IR are sensitive to the IR EM frequency domain, which may be a second EM frequency domain of the multiple EM frequency domains that the multi-domain image sensor 500 is sensitive to.

The multi-domain image sensor 500 can include a number of active lines (e.g., 1944 or other number of active lines) for reading photodetector data from the multi-domain image sensor 500, for instance to capture the multi-domain image data 210 using the multi-domain image sensor 500. In some cases, the multi-domain image sensor 500 can include a number of "active dummy" lines (e.g., 32 or other number of active dummy lines) for reading "dummy" photodetector data. For instance, the "dummy" photodetector data can be used to detect and/or correct leakage current, for image stabilization, for PDAF, for CDAF, for calibration, and/or for other purposes. In some cases, the "dummy" photodetector data is included in the multi-domain image data 210. In some examples, the "dummy" photodetector data is excluded in the multi-domain image data 210.

FIG. 6 is a block diagram illustrating an example architecture an imaging system 600 that performs an imaging process using a multi-domain image sensor that is sensitive to a first electromagnetic (EM) frequency domain 620 and a second EM frequency domain 625. The imaging system captures dual-domain raw image data 605 using a dual-domain image sensor 602. The dual-domain image sensor 602 is an example of the multi-domain image sensor 205 that is sensitive to the first EM frequency domain 620 and the second EM frequency domain 625. The dual-domain raw image data 605 is an example of the multi-domain image data 210 that includes photodetector data from a first set of photodetectors sensitive to the first EM frequency domain 620 and photodetector data from a second set of photodetectors sensitive to the second EM frequency domain 625.

The imaging system 600 (e.g., an image processor 215 of the imaging system 600) performs demosaicing and/or pixel interpolation 610 on the dual-domain raw image data 605 to divide the dual-domain raw image data 605 into single-domain images associated with the first EM frequency domain 620 and the second EM frequency domain 625, respectively. In the illustrated example of FIG. 6, the first EM frequency domain 620 is the visible light EM frequency domain, and includes sub-domains red 630 (R), green 635 (G), and blue 640 (B). In the illustrated example of FIG. 6, the second EM frequency domain 625 is the IR EM frequency domain.

At the stage immediately following demosaicing and/or pixel interpolation 610, the single-domain image data may include potential visual artifacts 615. The potential visual artifacts 615 may include focus blur, since the lens corresponding to the dual-domain image sensor 602 can only be in one position at a time. Thus, if a focus mechanism 240 sets the position of the lens to a first lens position according to a first focus setting for first EM frequency domain 620 (e.g., as determined using the focus setting generator 235), then the single-domain image data for the first EM frequency domain 620 is clear and sharp and in-focus, but the single-domain image data for the second EM frequency domain 625 may be blurry and out-of-focus. On the other hand, if a focus mechanism 240 sets the position of the lens to a second lens position according to a second focus setting for second EM frequency domain 625 (e.g., as determined using the focus setting generator 235), then the single-domain image data for the second EM frequency domain 625 is clear and sharp and in-focus, but the single-domain image data for the first EM frequency domain 620 may be blurry and out-of-focus.

The potential visual artifacts 615 corresponding to focus blur can be resolved by alternating focus settings on a frame-by-frame basis. For instance, the imaging system 600 can apply a second focus setting for the second EM frequency domain 625 before capturing the $N^{th}$ frame using the dual-domain image sensor 602, and can generate a single-domain image (e.g., one of the focused images 655) for the second EM frequency domain 625 using the $N^{th}$ frame captured by the dual-domain image sensor 602. The imaging system 600 can apply a first focus setting for the first EM frequency domain 620 before capturing the $(N+1)^{th}$ frame using the dual-domain image sensor 602, and can generate a single-domain image (e.g., one of the focused images 650) for the first EM frequency domain 620 using the $(N+1)^{th}$ frame captured by the dual-domain image sensor 602. This way, both single-domain images are captured according to the respective focus setting that is appropriate for the corresponding EM frequency domain. The imaging system 600 can continue this way, producing a stream of focused images 650 in the first EM frequency domain 620 and a stream of focused images 655 in the second EM frequency domain 625.

If the dual-domain image sensor 602 can capture dual-domain raw image data 605 at 60 fps, then the stream of focused images 650 in the first EM frequency domain 620 and the stream of focused images 655 in the second EM frequency domain 625 can both be output at 30 fps. If the dual-domain image sensor 602 can capture dual-domain raw image data 605 at 90 fps, then the focused images 650 and the focused images 655 can both be output at 45 fps. If the dual-domain image sensor 602 can capture dual-domain raw image data 605 at 120 fps, then the focused images 650 and the focused images 655 can both be output at 60 fps. If the dual-domain image sensor 602 can capture dual-domain raw image data 605 at 240 fps, then the focused images 650 and the focused images 655 can both be output at 120 fps. If the dual-domain image sensor 602 can capture dual-domain raw image data 605 at 480 fps, then the focused images 650 and the focused images 655 can both be output at 240 fps. If the dual-domain image sensor 602 can capture dual-domain raw image data 605 at 30 fps, then the focused images 650 and the focused images 655 can both be output at 15 fps. If the dual-domain image sensor 602 can capture dual-domain raw image data 605 at M fps, then the focused images 650 and the focused images 655 can both be output at M/2 fps.

The potential visual artifacts 615 may also include cross-domain contamination, which can produce visual artifacts such as false colors and/or chromatic aberration(s), and can appear particularly at or around sharp edges in the image. The potential visual artifacts 615 corresponding to focus blur can be resolved using cross-domain contamination reduction 640.

The imaging system 600 (e.g., an image processor 215 of the imaging system 600) performs cross-domain contamination reduction 640 on the single-domain image data from the first EM frequency domain 620 and/or the image data from the second EM frequency domain 625, for instance as discussed previously with respect to the image processor 215. For instance, to remove cross-domain contamination from the second EM frequency domain 625 (IR) from a single-domain image from the first EM frequency domain 620 (VL), a pixel data value from a given IR-sensitive photodetector can be multiplied by a constant, and the product can be subtracted from the pixel data value from a VL-sensitive photodetector that is adjacent to the IR-sensitive photodetector. Different constants can be used for different colors or subsets of an EM frequency domain. For instance, the pixel data value from a given IR-sensitive photodetector can be multiplied by a first constant a, and the product can be subtracted from the pixel data value from a red-sensitive photodetector that is adjacent to the IR-sensitive photodetector. The pixel data value from a given IR-sensitive photodetector can be multiplied by a second constant b, and the product can be subtracted from the pixel data value from a green-sensitive photodetector that is adjacent to the IR-sensitive photodetector. the pixel data value from a given IR-sensitive photodetector can be multiplied by a third constant c, and the product can be subtracted from the pixel data value from a blue-sensitive photodetector that is adjacent to the IR-sensitive photodetector. These calculations are represented using the equations Red=R−a×IR, Green=G−b×IR, and Blue=B−c×IR.

In some examples, values for the constants a, b, and/or c can range from 0 to 1, for instance including 0.0, 0.1, 0.2, 0.3, 0.4, 0.5, 0.6, 0.7, 0.8, 0.9, 1.0, or a value in between any of the listed values. In some examples, values for the constants a, b, and/or c can exceed 1. In some examples, values for the constants a, b, and/or c can be different from one another. In some examples, values for two or more of the constants a, b, and/or c can be equal to one another.

In some examples, a value $IR_{avg}$ may be determined as an average of the value $IR_N$ for the given IR photodiode on the $N^{th}$ frame and the value $IR_{N+1}$ for the given IR photodiode on the $(N+1)^{th}$ frame using the equation $IR_{avg}=(IR_N+IR_{N+1})/2$. The cross-domain contamination reduction 640 calculations can use Red=R−a×$IR_{avg}$, Green=G−b×$IR_{avg}$, and Blue=B−c×$IR_{avg}$.

In some examples, the imaging system 600 (e.g., a single-domain remosaicing engine 220 of the imaging system 600) can perform remosaicing 645 the image data that is processed using the cross-domain contamination reduction 640 into the first EM frequency domain 620 as discussed with respect to the single-domain remosaicing engine 220. The focused images 650 can therefore be remosaiced using the remosaicing 645.

Figure 7:
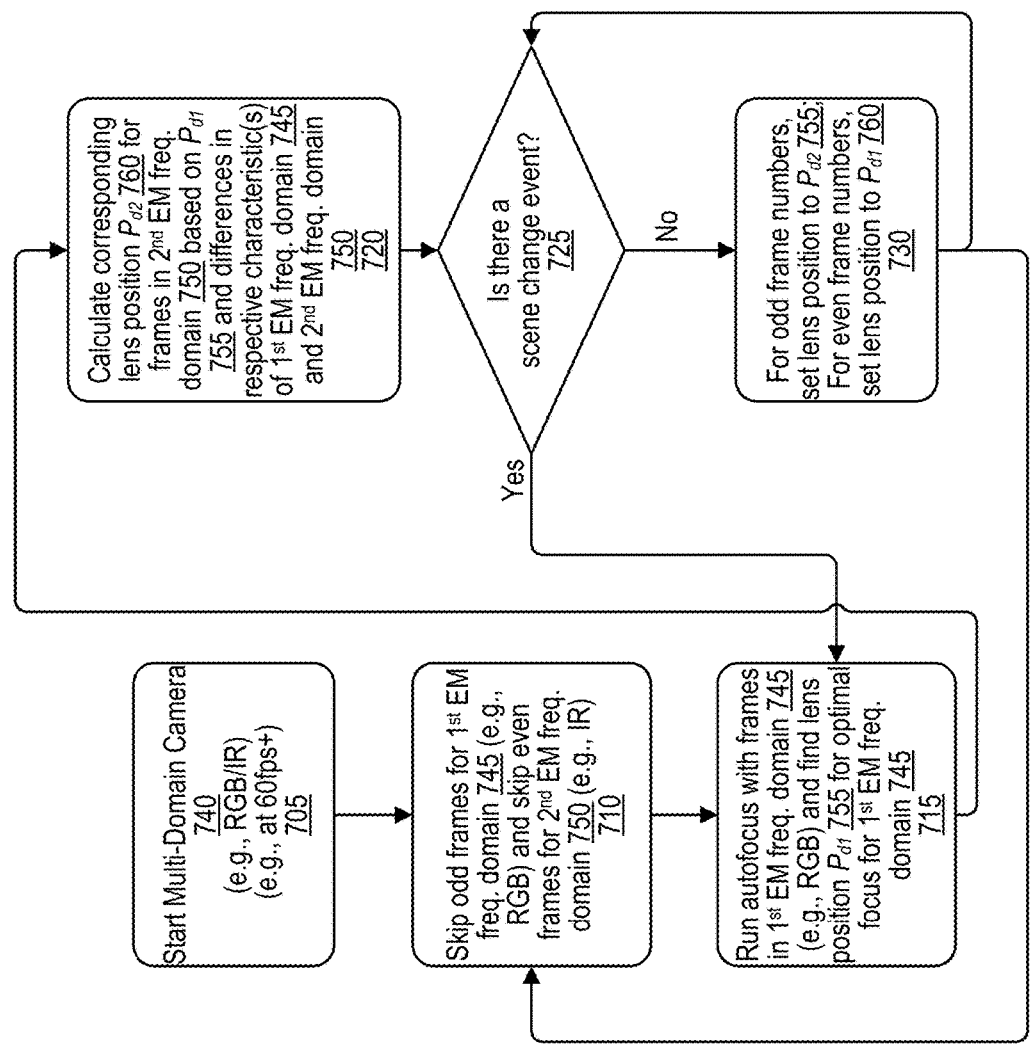
FIG. 7 is a flow diagram illustrating an imaging process performed by an imaging system having a multi-domain image sensor that is sensitive to a first domain and a second domain, in accordance with some examples.

FIG. 7 is a flow diagram illustrating an imaging process 700 performed by an imaging system having a multi-domain image sensor that is sensitive to a first domain and a second domain. The imaging process 900 may be performed by an imaging system. In some examples, the imaging system can include, for example, the image capture and processing system 100, the image capture device 105A, the image processing device 105B, the image processor 150, the ISP 154, the host processor 152, the imaging system 200, the multi-domain image sensor 205, the image processor 215, the single-domain remosaicing engine 220, the output device(s) 230, the focus setting generator 235, the HMD 310, the mobile handset 410, the multi-domain image sensor 500, the imaging system 600, an imaging system that performs the imaging process 800, an imaging system that performs the imaging process 900, the computing system 1000, the processor 1010, or a combination thereof.

At operation 705, the imaging system may start a multi-domain camera 740. The multi-domain camera 740 is configured to capture image data in multiple EM frequency domains, including a first EM frequency domain 745 (e.g., visible light) and a second EM frequency domain 750 (e.g., IR). In some examples, the multi-domain camera 740 is configured to capture the image data at 60 fps. The multi-domain camera 740 can be an example of the image capture and processing system 100, the image capture device 105A, image sensor 130, the multi-domain image sensor 205, the first camera 330A, the second camera 330B, the third camera 330C, the fourth camera 330D, the first camera 430A, the second camera 430B, the third camera 430C, the fourth camera 430D, the multi-domain image sensor 500, the dual-domain image sensor 602, a camera that captures the images of the imaging process 800, a camera that includes the image sensor of the imaging process 900, a camera of an input device 1045, another camera and/or image sensor described herein, another sensor described herein, or a combination thereof.

At operation 710, the imaging system may skip odd frames for the first EM frequency domain 745 (e.g., visible light), and skip even frames for second EM frequency domain 750 (e.g., IR). For instance, in the context of FIG. 6, the $N^{th}$ frame can be an example of an odd frame to be skipped for the first EM frequency domain 745 (e.g., visible light), while the $(N+1)^{th}$ frame can be an example of an even frame to be skipped for the second EM frequency domain 750 (e.g., IR).

At operation 715, the imaging system may run autofocus with frames in first EM frequency domain 745 (e.g., visible light) and find lens position $P_{d1}$ 755 for optimal focus for first EM frequency domain 745. The lens position $P_{d1}$ 755 for the first EM frequency domain 745 can be an example of the first focus setting 250 for the first EM frequency domain 255. Running autofocus in operation 715 can be performed using the focus setting generator 235, and can include CDAF, PDAF, HAF, or a combination thereof.

At operation 720, the imaging system may calculate corresponding lens position $P_{d2}$ 760 for frames in second EM frequency domain 750 based on $P_{d1}$ 755 and differences in respective characteristic(s) of first EM frequency domain 745 and second EM frequency domain 750. The lens position $P_{d2}$ 760 for the second EM frequency domain 750 can be an example of the second focus setting 260 for the second EM frequency domain 265. Calculating the lens position $P_{d2}$ 760 for frames in second EM frequency domain 750 based on $P_{d1}$ 755 and the differences in respective characteristic(s) of first EM frequency domain 745 and second EM frequency domain 750 can be performed using the focus setting generator 235, and can be an example of calculating the second focus setting 260 for the second EM frequency domain 265 based on the first focus setting 250 for the first EM frequency domain 255 and the differences in respective characteristic(s) of first EM frequency domain 255 and second EM frequency domain 265. Examples of the respective characteristics include respective frequencies, wavelengths, and/or focal lengths associated with the first EM frequency domain 745 and the second EM frequency domain 750.

At operation 725, the imaging system may determine whether there is a scene change event. A scene change event can include an event in which a distance between the lens and a subject (u), and/or a distance between the image sensor and a subject, changes. If there is a scene change event, the imaging system may perform operation 715 after operation 725. If there is no scene change event, the imaging system may perform operation 730 after operation 725.

At operation 730, the imaging system may set lens position to $P_{d2}$ 755 for odd frame numbers, and set lens position to $P_{d1}$ 760 for even frame numbers. In some examples, the imaging system may capture and/or generate image data in the second EM frequency domain 750 on odd frame numbers while the lens position is set to $P_{d2}$ 755. In some examples, the imaging system may capture and/or generate image data in the first EM frequency domain 745 on even frame numbers while the lens position is set to $P_{d1}$ 750.

At operation 730, the imaging system may perform operation 725 after operation 730. In some examples, the imaging system may perform operation 710 after operation 730.

Figure 8:
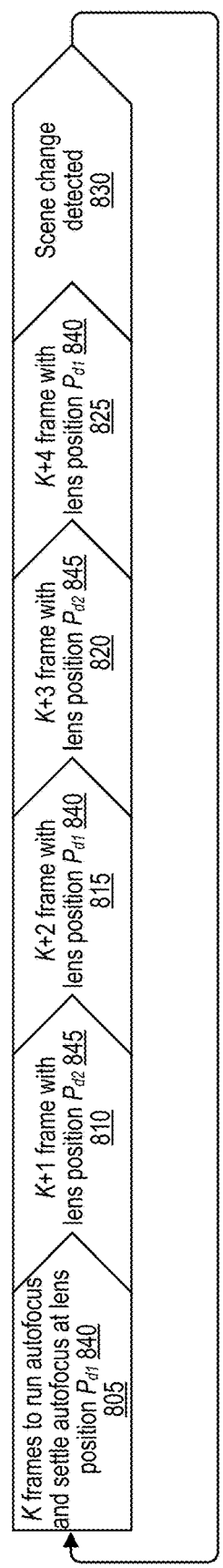
FIG. 8 is a flow diagram illustrating an imaging process performed by an imaging system having a multi-domain image sensor that is sensitive to a first domain and a second domain, in accordance with some examples.

FIG. 8 is a flow diagram illustrating an imaging process 800 performed by an imaging system having a multi-domain image sensor that is sensitive to a first domain and a second domain. The imaging process 900 may be performed by an imaging system. In some examples, the imaging system can include, for example, the image capture and processing system 100, the image capture device 105A, the image processing device 105B, the image processor 150, the ISP 154, the host processor 152, the imaging system 200, the multi-domain image sensor 205, the image processor 215, the single-domain remosaicing engine 220, the output device(s) 230, the focus setting generator 235, the HMD 310, the mobile handset 410, the multi-domain image sensor 500, the imaging system 600, an imaging system that performs the imaging process 700, an imaging system that performs the imaging process 900, the computing system 1000, the processor 1010, or a combination thereof.

At operation 805, the imaging system may use K frames to run autofocus for a first EM frequency domain, and settle autofocus at a lens position $P_{d1}$ 840 for the first EM frequency domain. The imaging system can also calculate a lens position $P_{d2}$ 845 for a first EM frequency domain based on the lens position $P_{d1}$ 840 and a difference in respective characteristic(s) of first EM frequency domain and second EM frequency domain. The lens position $P_{d1}$ 840 for the first EM frequency domain can be an example of the first focus setting 250 for the first EM frequency domain 255. The lens position $P_{d2}$ 845 for the second EM frequency domain can be an example of the second focus setting 260 for the second EM frequency domain 265.

At operation 810, the imaging system may capture and/or generate the $(K+1)^{th}$ frame with the lens at lens position $P_{d2}$ 845. At operation 815, the imaging system may capture and/or generate the $(K+2)^{th}$ frame with the lens at lens position $P_{d1}$ 840. At operation 820, the imaging system may capture and/or generate the $(K+3)^{th}$ frame with the lens at lens position $P_{d2}$ 845. At operation 825, the imaging system may capture and/or generate the $(K+4)^{th}$ frame with the lens at lens position $P_{d1}$ 840.

At operation 830, the imaging system may detect a scene change, as in operation 725. The imaging system can perform operation 805 after detecting the scene change in operation 830.

FIG. 9 is a flow diagram illustrating an imaging process 900. The imaging process 900 may be performed by an imaging system. In some examples, the imaging system can include, for example, the image capture and processing system 100, the image capture device 105A, the image processing device 105B, the image processor 150, the ISP 154, the host processor 152, the imaging system 200, the multi-domain image sensor 205, the image processor 215, the single-domain remosaicing engine 220, the output device(s) 230, the focus setting generator 235, the HMD 310, the mobile handset 410, the multi-domain image sensor 500, the imaging system 600, an imaging system that performs the imaging process 700, an imaging system that performs the imaging process 800, the computing system 1000, the processor 1010, or a combination thereof.

At operation 905, the imaging system may determine, based on image data of a scene received from an image sensor, a first focus setting for focusing on the scene using the image sensor in a first electromagnetic (EM) frequency domain. In one illustrative example, imaging system may determine the first focus setting based on a focal length associated with the image sensor and the first EM frequency domain. Additionally or alternatively, in another illustrative example, imaging system may determine the first focus setting based on a distance between a lens and at least a portion of the scene, where the lens is associated with the image sensor.

At operation 910, the imaging system may determine, based on the first focus setting and a difference between respective characteristics of the first EM frequency domain and a second EM frequency domain, a second focus setting for focusing on the scene using the image sensor in the second EM frequency domain. For instance, similar to examples described herein, the first EM frequency domain may include at least a portion of a visible light EM frequency domain, and the second EM frequency domain may include at least a portion of an infrared (IR) EM frequency domain. Examples of the first EM frequency domain and/or the second EM frequency domain include the first EM frequency domain 255, the second EM frequency domain 265, the first EM frequency domain 620, the second EM frequency domain 625, the first EM frequency domain 745, the second EM frequency domain 750, the radio EM frequency domain, the microwave EM frequency domain, the infrared (IR) EM frequency domain, the visible light (VL) EM frequency domain, the ultraviolet (UV) EM frequency domain, the X-Ray EM frequency domain, the gamma ray EM frequency domain, the red EM frequency domain, the green EM frequency domain, the blue EM frequency domain, the NIR EM frequency domain, another EM frequency domain described herein, a subset of any of these, or a combination thereof.

Examples of the first focus setting include the first focus setting 250 for the first EM frequency domain 255, the distance from the lens to the image sensor for the first EM frequency domain 255 ($w_{d1}$), the lens position $P_{d1}$ 755, the lens position $P_{d1}$ 840, or a combination thereof. Examples of the second focus setting include the second focus setting 255 for the second EM frequency domain 265, the distance from the lens to the image sensor for the second EM frequency domain 265 ($w_{d2}$), the lens position $P_{d2}$ 760, the lens position $P_{d2}$ 845, or a combination thereof.

Examples of the respective characteristics of the first EM frequency domain and the second EM frequency domain include respective frequencies, wavelengths, and/or focal lengths associated with the first EM frequency domain 745 and the second EM frequency domain 750.

Examples of the image sensor includes the image sensor 130, the multi-domain image sensor 205, the first camera 330A, the second camera 330B, the third camera 330C, the fourth camera 330D, the first camera 430A, the second camera 430B, the third camera 430C, the fourth camera 430D, the multi-domain image sensor 500, the dual-domain image sensor 602, an image sensor of the multi-domain camera 740 of the imaging process 700, an image sensor that captures the images of the imaging process 800, the image sensor of the imaging process 900, an image sensor of an input device 1045, another image sensor described herein, another sensor described herein, or a combination thereof.

In some cases, the image sensor includes a first set of photodetectors configured to detect the first EM frequency domain and a second set of photodetectors configured to detect a second EM frequency domain. In some examples, the first set of photodetectors include a plurality of subsets of the first set of photodetectors. For instance, the plurality of subsets of the first set of photodetectors may be associated with a plurality of subsets of the first EM frequency domain.

In some examples, the imaging system may receive the image data from the image sensor before operation 905. In some examples, the imaging system includes an image sensor connector that couples and/or connects the image sensor to a remainder of the imaging system (e.g., including the processor and/or the memory of the imaging system). In some cases, the imaging system receives the image data from the image sensor by receiving the image data from, over, and/or using the image sensor connector.

Examples of the image data include image data captured using the image capture and processing system 100, multi-domain image data 210, image data captured using the first camera 330A, image data captured using the second camera 330B, image data captured using the third camera 330C, image data captured using the fourth camera 330D, image data captured using the first camera 430A, image data captured using the second camera 430B, image data captured using the third camera 430C, image data captured using the fourth camera 430D, image data captured using the multi-domain image sensor 500, the dual-domain raw image data 605, image frames captured by the multi-domain camera 740 of the imaging process 700, the various image frames captured during the imaging process 800, or a combination thereof.

At operation 915, the imaging system may cause the image sensor to capture a first image of the scene in the first EM frequency domain according to the first focus setting. At operation 920, the imaging system may cause the image sensor to capture a second image of the scene in the second EM frequency domain according to the second focus setting. In some cases, the imaging system may capture, using the image sensor, the first image of the scene in the first EM frequency domain according to the first focus setting and capture, using the image sensor, the second image of the scene in the second EM frequency domain according to the second focus setting. In some aspects, the imaging system may cause a lens to be moved to a first position corresponding to the first focus setting before capture of the first image, wherein the lens is associated with the image sensor. In some cases, the imaging system may further cause the lens to be moved to a second position corresponding to the second focus setting after capture of the first image and before capture of the second image.

In some examples, the imaging system may reduce data associated with the second EM frequency domain from data associated with the first EM frequency domain (e.g., using the cross-domain contamination reduction 640 described with respect to FIG. 6) to reduce contamination from the second EM frequency domain in the first image. Additionally or alternatively, imaging system may reduce data associated with the first EM frequency domain from data associated with the second EM frequency domain (e.g., using the cross-domain contamination reduction 640 described with respect to FIG. 6) to reduce contamination from the first EM frequency domain in the second image.

In some cases, the imaging system may output the first image and the second image. For instance, the imaging system may output the first image at a first time and output the second image at a second time that is distinct from the first time. In some examples, the imaging system may display (e.g., via a display) the first image and the second image. In some cases, the imaging system may transmit the first image and the second image to a recipient device.

In some examples, the processes described herein (e.g., the respective processes of FIGS. 1, 2, 5, 6, the imaging process 700, the imaging process 800, the imaging process 900, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200, the multi-domain image sensor 205, the image processor 215, the single-domain remosaicing engine 220, the output device(s) 230, the focus setting generator 235, the HMD 310, the mobile handset 410, the multi-domain image sensor 500, the imaging system 600, an imaging system that performs the imaging process 700, an imaging system that performs the imaging process 800, an imaging system that performs the imaging process 900, the computing system 1000, the processor 1010, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
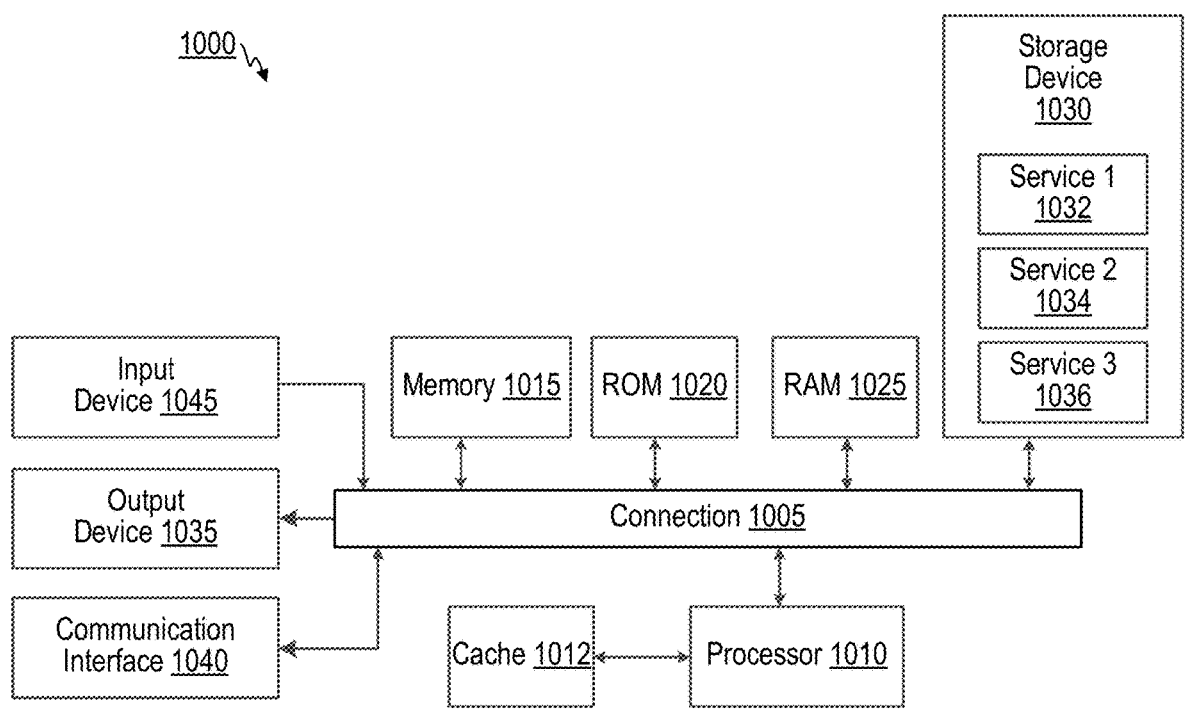
FIG. 10 is a diagram illustrating an example of a computing system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Disclosure Include:

Aspect 1. An apparatus for determining one or more image settings, the apparatus comprising: at least one memory; and at least one processor coupled to the at least one memory, the at least one processor configured to: determine, based on image data of a scene received from an image sensor, a first focus setting for focusing on the scene using the image sensor in a first electromagnetic (EM) frequency domain; determine, based on the first focus setting and a difference between respective characteristics of the first EM frequency domain and a second EM frequency domain, a second focus setting for focusing on the scene using the image sensor in the second EM frequency domain; cause the image sensor to capture a first image of the scene in the first EM frequency domain according to the first focus setting; and cause the image sensor to capture a second image of the scene in the second EM frequency domain according to the second focus setting.

Aspect 2. The apparatus of Aspect 1, wherein the first EM frequency domain includes at least a portion of a visible light EM frequency domain, and wherein the second EM frequency domain includes at least a portion of an infrared (IR) EM frequency domain.

Aspect 3. The apparatus of any of Aspects 1 to 2, wherein the image sensor includes a first set of photodetectors configured to detect the first EM frequency domain and a second set of photodetectors configured to detect a second EM frequency domain.

Aspect 4. The apparatus of Aspect 3, wherein the first set of photodetectors include a plurality of subsets of the first set of photodetectors, the plurality of subsets of the first set of photodetectors being associated with a plurality of subsets of the first EM frequency domain.

Aspect 5. The apparatus of any of Aspects 1 to 4, wherein, to determine the first focus setting, the at least one processor is configured to determine the first focus setting based on a focal length associated with the image sensor and the first EM frequency domain.

Aspect 6. The apparatus of any of Aspects 1 to 5, wherein, to determine the first focus setting, the at least one processor is configured to determine the first focus setting based on a distance between a lens and at least a portion of the scene, wherein the lens is associated with the image sensor.

Aspect 7. The apparatus of any of Aspects 1 to 6, wherein the at least one processor configured to: cause a lens to be moved to a first position corresponding to the first focus setting before capture of the first image, wherein the lens is associated with the image sensor; and cause the lens to be moved to a second position corresponding to the second focus setting after capture of the first image and before capture of the second image.

Aspect 8. The apparatus of any of Aspects 1 to 7, wherein the at least one processor configured to: reduce data associated with the second EM frequency domain from data associated with the first EM frequency domain to reduce contamination from the second EM frequency domain in the first image.

Aspect 9. The apparatus of any of Aspects 1 to 8, wherein the at least one processor configured to: reduce data associated with the first EM frequency domain from data associated with the second EM frequency domain to reduce contamination from the first EM frequency domain in the second image.

Aspect 10. The apparatus of any of Aspects 1 to 9, wherein the at least one processor is configured to: output the first image and the second image.

Aspect 11. The apparatus of any of Aspects 1 to 10, wherein the at least one processor is configured to: output the first image at a first time; and output the second image at a second time that is distinct from the first time.

Aspect 12. The apparatus of any of Aspects 1 to 11, further comprising: a display configured to display the first image and the second image.

Aspect 13. The apparatus of any of Aspects 1 to 12, further comprising: a communication transceiver configured to transmit the first image and the second image to a recipient device.

Aspect 14. The apparatus of any of Aspects 1 to 13, wherein the apparatus includes at least one of a head-mounted display (HMD), a mobile handset, or a wireless communication device.

Aspect 15. A method of determining one or more image settings, the method comprising: determining, based on image data of a scene received from an image sensor, a first focus setting for focusing on the scene using the image sensor in a first electromagnetic (EM) frequency domain; determining, based on the first focus setting and a difference between respective characteristics of the first EM frequency domain and a second EM frequency domain, a second focus setting for focusing on the scene using the image sensor in the second EM frequency domain; cause the image sensor to capture a first image of the scene in the first EM frequency domain according to the first focus setting; and cause the image sensor to capture a second image of the scene in the second EM frequency domain according to the second focus setting.

Aspect 16. The method of Aspect 15, wherein the first EM frequency domain includes at least a portion of a visible light EM frequency domain, and wherein the second EM frequency domain includes at least a portion of an infrared (IR) EM frequency domain.

Aspect 17. The method of any of Aspects 15 to 16, wherein the image sensor includes a first set of photodetectors configured to detect the first EM frequency domain and a second set of photodetectors configured to detect a second EM frequency domain.

Aspect 18. The method of Aspect 17, wherein the first set of photodetectors include a plurality of subsets of the first set of photodetectors, the plurality of subsets of the first set of photodetectors being associated with a plurality of subsets of the first EM frequency domain.

Aspect 19. The method of any of Aspects 15 to 18, wherein determining the first focus setting includes determining the first focus setting based on a focal length associated with the image sensor and the first EM frequency domain.

Aspect 20. The method of any of Aspects 15 to 19, wherein determining the first focus setting includes determining the first focus setting based on a distance between a lens and at least a portion of the scene, wherein the lens is associated with the image sensor.

Aspect 21. The method of any of Aspects 15 to 20, further comprising: causing a lens to be moved to a first position corresponding to the first focus setting before capture of the first image, wherein the lens is associated with the image sensor; and causing the lens to be moved to a second position corresponding to the second focus setting after capture of the first image and before capture of the second image.

Aspect 22. The method of any of Aspects 15 to 21, further comprising: reducing data associated with the second EM frequency domain from data associated with the first EM frequency domain to reduce contamination from the second EM frequency domain in the first image.

Aspect 23. The method of any of Aspects 15 to 22, further comprising: reducing data associated with the first EM frequency domain from data associated with the second EM frequency domain to reduce contamination from the first EM frequency domain in the second image.

Aspect 24. The method of any of Aspects 15 to 23, further comprising: outputting the first image and the second image.

Aspect 25. The method of any of Aspects 15 to 24, further comprising: outputting the first image at a first time; and outputting the second image at a second time that is distinct from the first time.

Aspect 26. The method of any of Aspects 15 to 25, further comprising: displaying the first image and the second image.

Aspect 27. The method of any of Aspects 15 to 26, further comprising: transmitting the first image and the second image to a recipient device.

Aspect 28. The method of any of Aspects 15 to 27, further comprising: capturing, using the image sensor, the first image of the scene in the first EM frequency domain according to the first focus setting; and capturing, using the image sensor, the second image of the scene in the second EM frequency domain according to the second focus setting.

Aspect 29. A non-transitory computer-readable medium having stored thereon instructions that, when executed by one or more processors, cause the one or more processors to perform operations according to any of Aspects 15-28.

Aspect 30. An apparatus for image processing, the apparatus comprising one or more means for performing operations according to any of Aspects 15-28.

What is claimed is:

1. An apparatus for determining image capture settings, the apparatus comprising:
   at least one memory; and
   at least one processor coupled to the at least one memory, the at least one processor configured to:
   determine, based on image data of a scene received from an image sensor, a first focus setting for focusing on the scene using the image sensor in a first electromagnetic (EM) frequency domain;
   calculate, after the first focus setting is determined and using the first focus setting and at least one ratio involving respective focal lengths associated with the first EM frequency domain and a second EM frequency domain, a second focus setting for focusing on the scene using the image sensor in the second EM frequency domain;
   cause the image sensor to capture a first image of the scene in the first EM frequency domain according to the first focus setting; and
   cause the image sensor to capture a second image of the scene in the second EM frequency domain according to the second focus setting.

2. The apparatus of claim 1, wherein the first EM frequency domain includes at least a portion of a visible light EM frequency domain, and wherein the second EM frequency domain includes at least a portion of an infrared (IR) EM frequency domain.

3. The apparatus of claim 1, wherein the image sensor includes a first set of photodetectors configured to detect the first EM frequency domain and a second set of photodetectors configured to detect a second EM frequency domain.

4. The apparatus of claim 3, wherein the first set of photodetectors include a plurality of subsets of the first set of photodetectors, the plurality of subsets of the first set of photodetectors being associated with a plurality of subsets of the first EM frequency domain.

5. The apparatus of claim 1, wherein, to determine the first focus setting, the at least one processor is configured to determine the first focus setting based on a focal length associated with the image sensor and the first EM frequency domain.

6. The apparatus of claim 1, wherein, to determine the first focus setting, the at least one processor is configured to determine the first focus setting based on a distance between a lens and at least a portion of the scene, wherein the lens is associated with the image sensor.

7. The apparatus of claim 1, wherein the at least one processor configured to:
cause a lens to be moved to a first position corresponding to the first focus setting before capture of the first image, wherein the lens is associated with the image sensor; and
cause the lens to be moved to a second position corresponding to the second focus setting after capture of the first image and before capture of the second image.

8. The apparatus of claim 1, wherein the at least one processor configured to:
reduce data associated with the second EM frequency domain from data associated with the first EM frequency domain to reduce contamination from the second EM frequency domain in the first image.

9. The apparatus of claim 1, wherein the at least one processor configured to:
reduce data associated with the first EM frequency domain from data associated with the second EM frequency domain to reduce contamination from the first EM frequency domain in the second image.

10. The apparatus of claim 1, wherein the at least one processor is configured to:
output the first image and the second image.

11. The apparatus of claim 1, wherein the at least one processor is configured to:
output the first image at a first time; and
output the second image at a second time that is distinct from the first time.

12. The apparatus of claim 1, further comprising:
a display configured to display the first image and the second image.

13. The apparatus of claim 1, further comprising:
a communication transceiver configured to transmit the first image and the second image to a recipient device.

14. The apparatus of claim 1, wherein the apparatus includes at least one of a head-mounted display (HMD), a mobile handset, or a wireless communication device.

15. A method of determining image capture settings, the method comprising:
determining, based on image data of a scene received from an image sensor, a first focus setting for focusing on the scene using the image sensor in a first electromagnetic (EM) frequency domain;
calculating, after the first focus setting is determined and using the first focus setting and at least one ratio involving respective focal lengths associated with the first EM frequency domain and a second EM frequency domain, a second focus setting for focusing on the scene using the image sensor in the second EM frequency domain;
causing the image sensor to capture a first image of the scene in the first EM frequency domain according to the first focus setting; and
causing the image sensor to capture a second image of the scene in the second EM frequency domain according to the second focus setting.

16. The method of claim 15, wherein the first EM frequency domain includes at least a portion of a visible light EM frequency domain, and wherein the second EM frequency domain includes at least a portion of an infrared (IR) EM frequency domain.

17. The method of claim 15, wherein the image sensor includes a first set of photodetectors configured to detect the first EM frequency domain and a second set of photodetectors configured to detect a second EM frequency domain.

18. The method of claim 17, wherein the first set of photodetectors include a plurality of subsets of the first set of photodetectors, the plurality of subsets of the first set of photodetectors being associated with a plurality of subsets of the first EM frequency domain.

19. The method of claim 15, wherein determining the first focus setting includes determining the first focus setting based on a focal length associated with the image sensor and the first EM frequency domain.

20. The method of claim 15, wherein determining the first focus setting includes determining the first focus setting based on a distance between a lens and at least a portion of the scene, wherein the lens is associated with the image sensor.

21. The method of claim 15, further comprising:
causing a lens to be moved to a first position corresponding to the first focus setting before capture of the first image, wherein the lens is associated with the image sensor; and
causing the lens to be moved to a second position corresponding to the second focus setting after capture of the first image and before capture of the second image.

22. The method of claim 15, further comprising:
reducing data associated with the second EM frequency domain from data associated with the first EM frequency domain to reduce contamination from the second EM frequency domain in the first image.

23. The method of claim 15, further comprising:
reducing data associated with the first EM frequency domain from data associated with the second EM frequency domain to reduce contamination from the first EM frequency domain in the second image.

24. The method of claim 15, further comprising:
outputting the first image and the second image.

25. The method of claim 15, further comprising:
outputting the first image at a first time; and
outputting the second image at a second time that is distinct from the first time.

26. The method of claim 15, further comprising:
displaying the first image and the second image.

27. The method of claim 15, further comprising:
transmitting the first image and the second image to a recipient device.

28. The method of claim 15, further comprising:
capturing, using the image sensor, the first image of the scene in the first EM frequency domain according to the first focus setting; and
capturing, using the image sensor, the second image of the scene in the second EM frequency domain according to the second focus setting.

29. A non-transitory computer-readable medium having stored thereon instructions that, when executed by one or more processors, cause the one or more processors to:
determine, based on image data of a scene received from an image sensor, a first focus setting for focusing on the scene using the image sensor in a first electromagnetic (EM) frequency domain;
calculate, after the first focus setting is determined and using the first focus setting and at least one ratio involving respective focal lengths associated with the first EM frequency domain and a second EM frequency domain, a second focus setting for focusing on the scene using the image sensor in the second EM frequency domain;
cause the image sensor to capture a first image of the scene in the first EM frequency domain according to the first focus setting; and cause the image sensor to capture a second image of the scene in the second EM frequency domain according to the second focus setting.

30. The apparatus of claim 1, wherein, to calculate the second focus setting, the at least one processor is configured to use an equation that factors in the first focus setting and the respective focal lengths, wherein the equation includes the at least one ratio.

\* \* \* \* \*